(12) United States Patent
Westerweck et al.

(10) Patent No.: US 7,580,209 B2
(45) Date of Patent: Aug. 25, 2009

(54) AUTO-FOCUS AND ZOOM MODULE WITH VIBRATIONAL ACTUATOR AND POSITION SENSING METHOD

(75) Inventors: Lothar Westerweck, San Jose, CA (US); Wolfram Grziwa, Amherst, NH (US)

(73) Assignee: Flextronics AP, LLC, Broomfield, CO (US)

( * ) Notice: Subject to any disclaimer, the term of this patent is extended or adjusted under 35 U.S.C. 154(b) by 0 days.

(21) Appl. No.: 11/893,940

(22) Filed: Aug. 17, 2007

(65) Prior Publication Data

US 2008/0068728 A1 Mar. 20, 2008

Related U.S. Application Data

(60) Provisional application No. 60/844,781, filed on Sep. 15, 2006.

(51) Int. Cl.
*G02B 7/02* (2006.01)
*H02N 2/00* (2006.01)

(52) U.S. Cl. ................................. 359/824; 310/323.06
(58) Field of Classification Search ......... 359/822–824, 359/826; 310/323.02–323.06
See application file for complete search history.

(56) References Cited

U.S. PATENT DOCUMENTS

| | | | | |
|---|---|---|---|---|
| 2,279,372 | A | 4/1942 | Herzberger | 88/57 |
| 3,087,384 | A | 4/1963 | Baur et al. | 88/57 |
| 3,599,377 | A | 8/1971 | Dartnell | 51/284 |
| 3,609,270 | A | 9/1971 | Jorgensen et al. | 200/67 |
| 4,879,592 | A | 11/1989 | Ernest | 358/42 |
| 5,016,993 | A | 5/1991 | Akitake | 350/429 |
| 5,095,204 | A | 3/1992 | Novini | 250/223 B |
| 5,177,638 | A | 1/1993 | Emura et al. | 359/704 |
| 5,196,963 | A | 3/1993 | Sato et al. | 359/699 |
| 5,272,567 | A | 12/1993 | Inoue | 359/696 |

(Continued)

FOREIGN PATENT DOCUMENTS

EP 1148406 A2 10/2001

(Continued)

OTHER PUBLICATIONS

"High Precision Optical Assembly Starts Here," (4 pages) 1996, Opto-Alignment Technology, Inc.

*Primary Examiner*—William C Choi
(74) *Attorney, Agent, or Firm*—Haverstock & Owens LLP

(57) ABSTRACT

Systems for positioning a functional element, such as an optical lens, include a housing, a primary guide pin coupled to the housing, a functional group that includes the functional element, and a vibrational actuator assembly. The functional group is movably coupled with the primary guide pin and includes a first friction surface and a second friction surface. The first and second friction surfaces are oriented relative to one another at one of an obtuse angle and a straight angle. The vibrational actuator assembly is substantially registered relative to the housing and includes a first drive element and a second drive element. The first drive element is configured to interact with the first friction surface and the second drive element is configured to interact with the second friction surface. The vibrational actuator assembly operates to translate the functional group. Some embodiments include position sensing elements configured to detect position(s) of the functional element(s), and control system(s) configured to operate the actuators based on feedback from the position sensing system(s).

17 Claims, 16 Drawing Sheets

U.S. PATENT DOCUMENTS

| | | | |
|---|---|---|---|
| 5,546,147 A | 8/1996 | Baxter et al. | 354/187 |
| 5,754,210 A | 5/1998 | Haneda et al. | 347/116 |
| 5,805,362 A | 9/1998 | Hayes | 359/819 |
| 5,835,208 A | 11/1998 | Hollmann et al. | 356/124 |
| 5,926,965 A | 7/1999 | Shijo et al. | 33/390 |
| 5,954,192 A | 9/1999 | Iitsuka | 200/336 |
| 5,966,248 A | 10/1999 | Kurokawa et al. | 359/697 |
| 6,091,902 A | 7/2000 | Komatsuzaki et al. | 396/60 |
| 6,292,306 B1 | 9/2001 | Betensky | 359/663 |
| 6,330,400 B1 | 12/2001 | Bittner et al. | 396/72 |
| 6,417,601 B1 | 7/2002 | Kim | 310/333 |
| 6,597,516 B2 | 7/2003 | Saitoh et al. | 359/694 |
| 6,760,167 B2 | 7/2004 | Meehan et al. | 359/822 |
| 6,762,888 B1 | 7/2004 | Oshima | 359/696 |
| 6,805,499 B2 | 10/2004 | Westerweck et al. | 396/448 |
| 6,869,233 B2 | 3/2005 | Westerweck et al. | 396/460 |
| 6,940,209 B2 | 9/2005 | Henderson | 310/323.02 |
| 7,088,525 B2 | 8/2006 | Finizion et al. | 359/703 |
| 7,193,793 B2 | 3/2007 | Murakami et al. | 359/791 |
| 7,259,497 B2 * | 8/2007 | Sakano et al. | 310/323.02 |
| 7,301,712 B2 | 11/2007 | Kamo | 359/785 |
| 7,330,648 B2 | 2/2008 | Morinaga et al. | 396/144 |
| 7,394,602 B2 | 7/2008 | Chen et al. | 359/785 |
| 7,400,454 B2 | 7/2008 | Kubota et al. | 359/689 |
| 7,420,609 B2 | 9/2008 | Yamaguchi | 348/335 |
| 2002/0018140 A1 | 2/2002 | Suemoto et al. | 348/358 |
| 2002/0102946 A1 | 8/2002 | SanGiovanni | 455/90 |
| 2003/0174419 A1 | 9/2003 | Kindler et al. | 359/819 |
| 2004/0056970 A1 | 3/2004 | Westerweck et al. | 348/240.3 |
| 2004/0203532 A1 | 10/2004 | Mizuta | 455/90.3 |
| 2004/0258405 A1 | 12/2004 | Shiratori et al. | 396/458 |
| 2005/0264670 A1 | 12/2005 | Yamaguchi et al. | 348/335 |
| 2006/0049720 A1 | 3/2006 | Henderson et al. | 310/328 |
| 2006/0056389 A1 | 3/2006 | Monk et al. | 370/352 |
| 2006/0113867 A1 | 6/2006 | Sakatani et al. | 310/323.17 |
| 2006/0291061 A1 | 12/2006 | Iyama et al. | 359/614 |
| 2007/0053672 A1 | 3/2007 | Westerweck et al. | 396/79 |
| 2007/0074966 A1 | 4/2007 | Yamamoto et al. | 200/547 |
| 2007/0077051 A1 | 4/2007 | Toor et al. | 396/144 |
| 2007/0077052 A1 | 4/2007 | Chang | 396/144 |
| 2007/0086777 A1 | 4/2007 | Fujita | 396/452 |
| 2007/0122146 A1 | 5/2007 | Ryu | 396/529 |

FOREIGN PATENT DOCUMENTS

| | | |
|---|---|---|
| EP | 1148406 A3 | 6/2002 |
| EP | 1357726 A1 | 10/2003 |
| GB | 1 378515 | 12/1974 |
| GB | 2315186 A | 1/1998 |
| GB | 2387063 A | 10/2003 |
| JP | 11-72678 | 3/1999 |
| JP | 2002-286987 | 10/2002 |

* cited by examiner

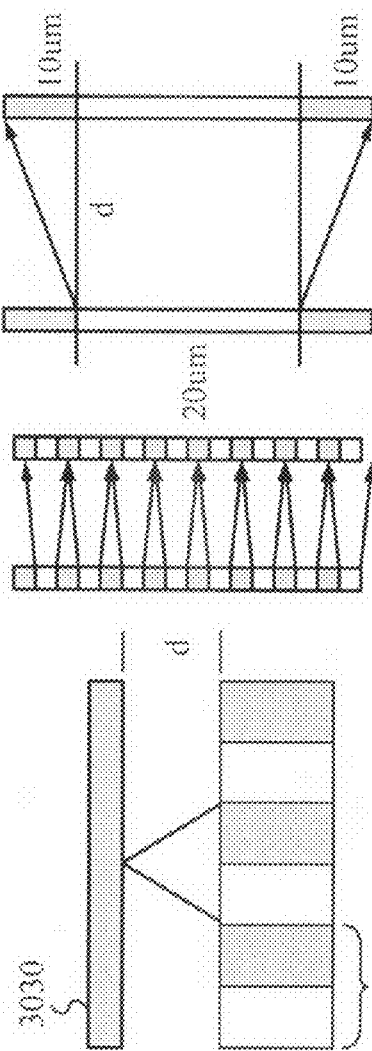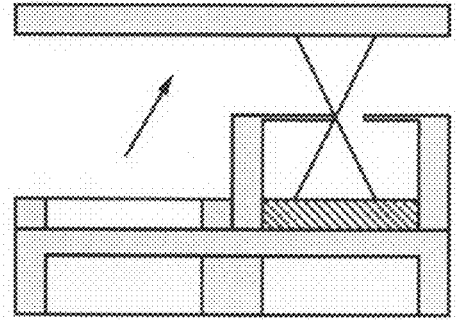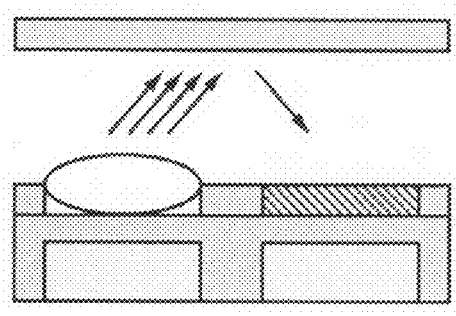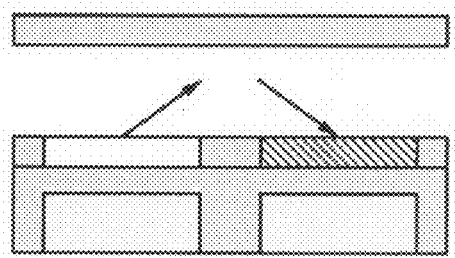

AUTO-FOCUS AND ZOOM MODULE WITH VIBRATIONAL ACTUATOR AND POSITION SENSING METHOD

RELATED APPLICATIONS

This patent application claims priority under 35 U.S.C. 119(e) of the U.S. Provisional Pat. App. No. 60/844,781, filed Sep. 15, 2006, entitled "ZOOM MODULE WITH PIEZO WAVE ACTUATOR USING END STOP AND AF/ZOOM POSITION SENSING METHOD, ARRANGEMENT AND METHOD OF DIRECT ACTIVATION OF FRONT LENS (AF/ZOOM) AND REAR LENS (ZOOM) COMPARTMENTS THROUGH SPECIAL CONFIGURED PIEZO WAVE ACTUATOR", which is hereby incorporated by reference.

FIELD OF THE INVENTION

The disclosure relates to camera optics, specifically an auto-focus and zoom module.

BACKGROUND

Recently, there have been numerous developments in digital camera technology. One such development is the further miniaturization of optical and mechanical parts to the millimeter and sub millimeter dimensions. The shrinkage in the moving parts of cameras has allowed the implementation of modern digital camera and optical technology into a broader range of devices. These devices are also constantly being designed and constructed into smaller and smaller form factor embodiments. For example, these days typical personal electronic devices such as cellular phones, personal digital assistants (PDAs), and wrist and/or pocket watches include a miniature digital camera. Moreover, larger form factor devices are also packed with additional features. For example, a typical video camcorder often has an entire digital camera for "still" photography built into the camcorder device along with the mechanisms and circuitry for motion video recording.

Typically, however, modern digital camera implementations suffer from a variety of constraints. Some of these constraints include cost, size, features, and complexity. For instance, with a reduction in size typically comes an increase in cost, a reduction in features and/or an increase in complexity.

SUMMARY OF THE DISCLOSURE

In some embodiments of the present invention, an optical module comprises a first optics group, a second optics group, and an image sensor, wherein the first optics group and second optics group are configured to provide an image having a focus and a magnification to the image sensor.

Some embodiments are systems for positioning a functional element, such as an optical lens, include a housing, a primary guide pin coupled to the housing and registered relative to the housing, a functional group that includes the functional element, and a vibrational actuator assembly. The functional group is movably coupled with the primary guide pin and includes a first friction surface and a second friction surface. The first and second friction surfaces are oriented relative to one another at one of an obtuse angle and a straight angle. The vibrational actuator assembly is coupled to the housing and substantially registered relative to the housing, and it includes a first drive element and a second drive element. The first drive element is configured to interact with the first friction surface and the second drive element is configured to interact with the second friction surface. The vibrational actuator assembly operates to translate the functional group. Some embodiments include position sensing elements configured to detect position(s) of the functional element(s), and control system(s) configured to operate the actuators based on feedback from the position sensing system(s).

Some embodiments are methods of driving a functional group within a system for positioning a functional element. For example, a method including steps of coupling a first friction surface to the functional group, coupling a second friction surface to the functional group at one of an obtuse angle and a straight angel to the first friction surface, configuring a first drive element of a vibrational actuator assembly to interact with the first friction surface, configuring a second drive element of the vibrational actuator assembly to interact with the second friction surface, and operating the first drive element and the second drive element of the vibrational actuator assembly to translate the optics housing.

Some embodiments are optical modules. For example, an optical module comprising a housing, a primary guide pin, an optics group slidably coupled to the primary guide pin, an optics element rigidly coupled to the optics group, a vibrational actuator assembly, a sensing target, and an image sensor. The primary guide pin is coupled to the housing and registered relative to the housing. Preferably, the optics group includes a first friction surface and a second friction surface. The first and second friction surfaces are arranged along an axis parallel with the primary guide pin. The first friction surface is directed along an axis perpendicular to the primary guide pin. The second surface directed along the axis perpendicular to the primary guide pin in a direction substantially opposite the first friction surface. The 'direction' of a friction surface refers to a normal vector out of the surface. The optics element is coupled to the optics group. The vibrational actuator assembly is substantially registered relative to the housing and includes a first drive element and a second drive element. The first drive element is configured to interact with the first friction surface and the second drive element is configured to interact with the second friction surface. The vibrational actuator assembly operates to translate the optics group. The sensing target is configured to permit detection of translation of the optics group.

BRIEF DESCRIPTION OF THE DRAWINGS

The novel features of the invention are set forth in the appended claims. However, for purpose of explanation, several embodiments of the invention are set forth in the following figures.

FIG. 15A is a schematic representation of a distance sensor in accordance with some embodiments of the invention.

FIG. 15B is a schematic representation of beam spreading that occurs during distance sensing in accordance with some embodiments of the invention.

FIG. 15C is a schematic representation of beam spreading that occurs during distance sensing in accordance with some embodiments of the invention.

FIG. 16A is a schematic illustration of a direct imaging solution for distance sensing in schematic representation of beam spreading that occurs during distance sensing in accordance with some embodiments of the invention.

FIG. 16B is a schematic illustration of a lens-based imaging solution for distance sensing in accordance with some embodiments of the invention.

FIG. 16C is a schematic illustration of a pinhole-based imaging solution for distance sensing in accordance with some embodiments of the invention.

DETAILED DESCRIPTION

In the following description, numerous details and alternatives are set forth for purpose of explanation. However, one of ordinary skill in the art will realize that the invention can be practiced without the use of these specific details. In other instances, well-known structures and devices are shown in block diagram form in order not to obscure the description of the invention with unnecessary detail.

Structural Overview

Embodiments of the present invention include a variety of types of modules that include functional groups, actuators for positioning those functional groups, and sensors and other control hardware for controlling the positioning of the functional groups. Though multiple implementations are consistent with the present invention, two broad types of embodiments are discussed herein. These types of embodiments have much in common, but there are some key differences.

In the first type, the actuator hardware is mounted in an actuator housing, which is separate from, but coupled to, a main housing that includes the functional groups and associated alignment hardware. The second type is built around an integrated chassis that includes mounting features for both the actuator hardware and for the functional groups and their associated alignment hardware.

Figure 1A:
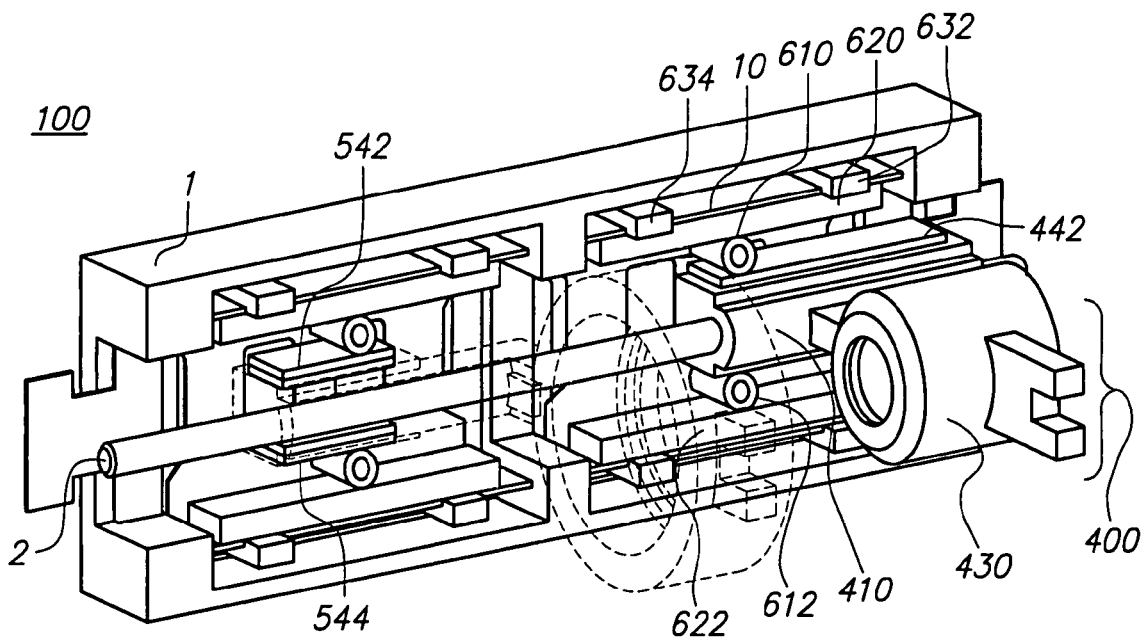
FIG. 1A is an isometric view from an optics-group side of an auto-focus and zoom module in accordance with some embodiments of the invention; one optics group is rendered transparently to permit illustration of an actuator interface.
Figure 1B:
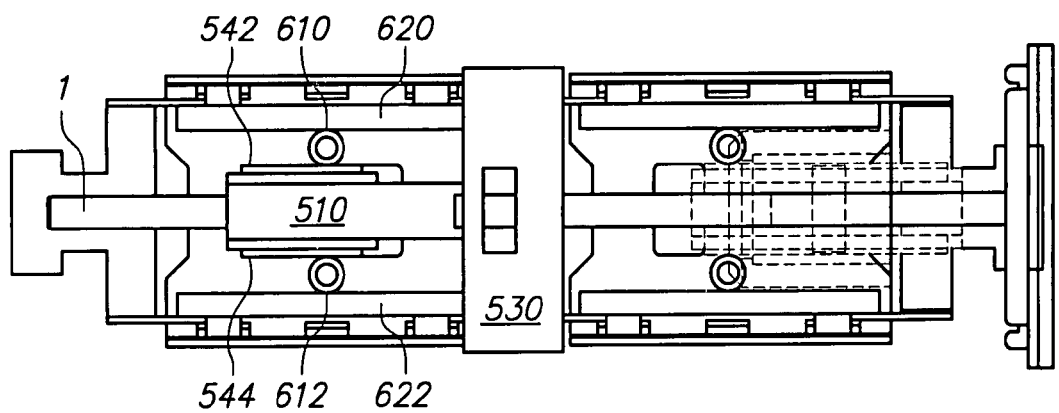
FIG. 1B is an elevation from an optics-group side of an auto-focus and zoom module in accordance with some embodiments of the invention; one optics group is rendered transparently to permit illustration of an actuator interface.

An exemplary module 100 of the first type is shown in FIG. 1A. A lateral aspect of the module 100 is shown, including a rear optics group 400 and a front optics group (dashed lines). The rear optics group 400 is slidably coupled to a primary guide pin 2. The optics groups are aligned along an axis parallel to that of the primary guide pin 2. The rear optics group 400 is coupled with actuators, e.g. 620 and 622, constrained within the actuator housing 1. The actuator housing comprises structural and electrical couplings configured to permit operation of the actuators. In operation, the rear actuators drive the rear optics group 400 along the axis of the primary guide pin 2 via the coupling between the actuator assembly and the rear optics group 400. The coupling between the front optics group and the actuator assembly permits a front actuator to achieve a similar purpose.

Figure 10:
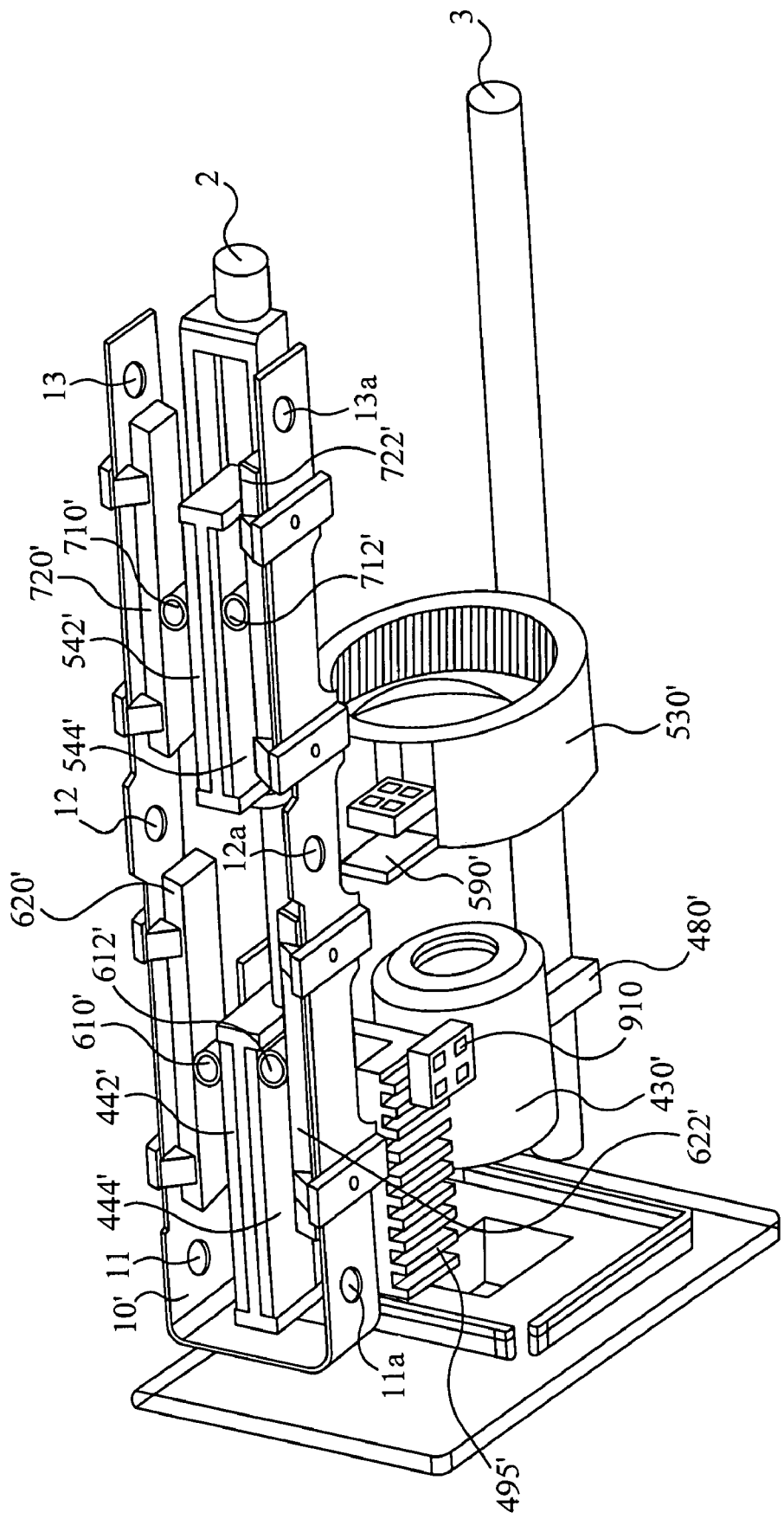
FIG. 10 is an isometric view from below of an auto-focus and zoom module in accordance with some embodiments of the invention.
Figure 11:
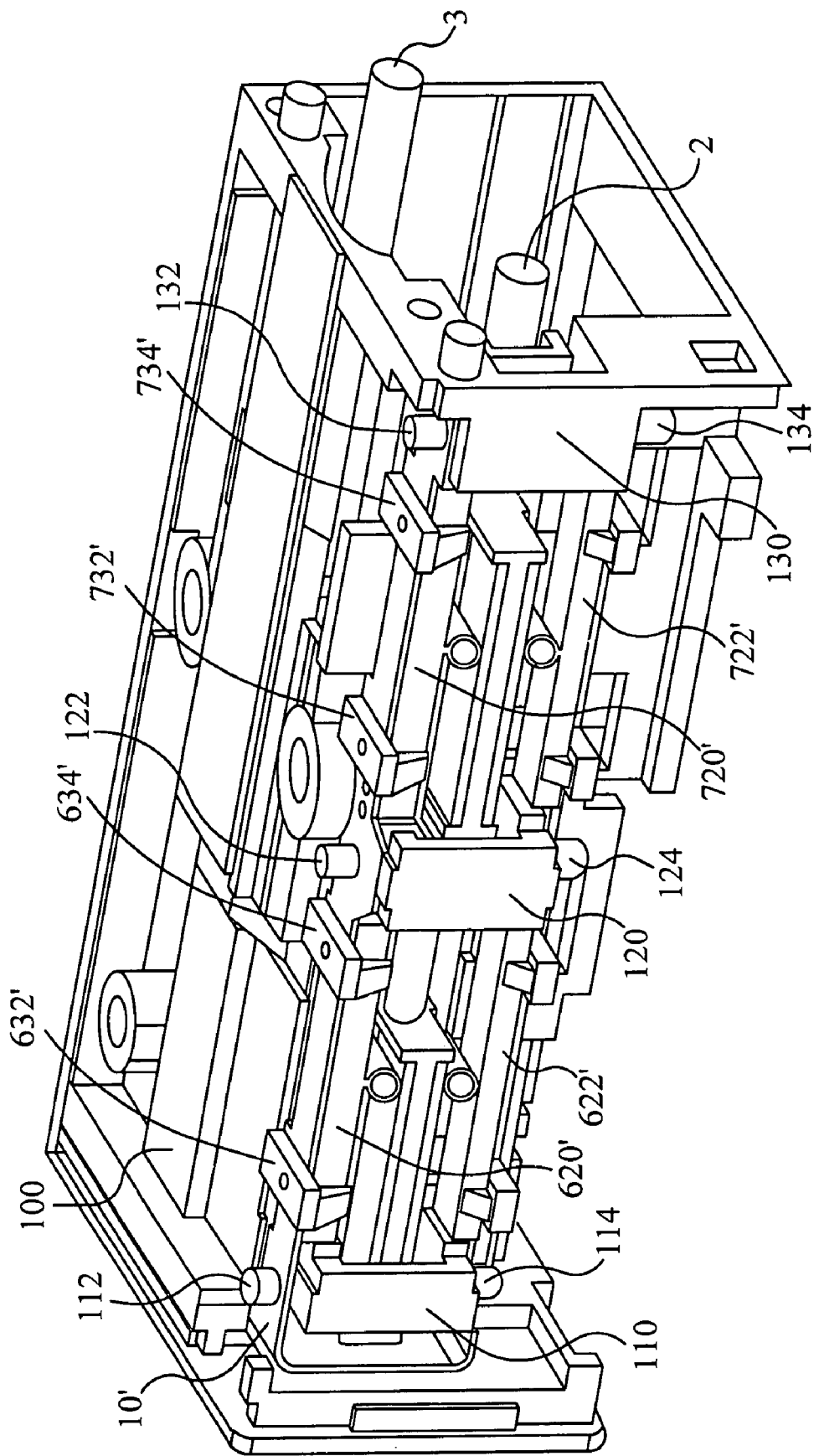
FIG. 11 is an isometric view from above of an auto-focus and zoom module in accordance with some embodiments of the invention; a main housing is included.

An exemplary module of the second type is shown in FIGS. 10 and 11. FIG. 11 shows the main housing 100, which couples the guide pins 2 and 3. The front and rear optics group are slidably coupled to the primary guide pin 2. The optics groups are aligned along an axis parallel to that of the primary guide pin 2. The actuators, e.g. 720' and 722', are constrained via coupling to the main housing 100, as illustrated in FIG. 11. The coupling to the main housing 100 comprises structural and electrical couplings configured to permit operation of the actuators. In operation, the rear actuators drive the rear optics group along the axis of the primary guide pin 2 via the coupling between the actuator assembly and the rear optics group. The coupling between the front optics group and the actuator assembly permits a front actuator to achieve a similar purpose.

Image Sensor

Figure 3A:
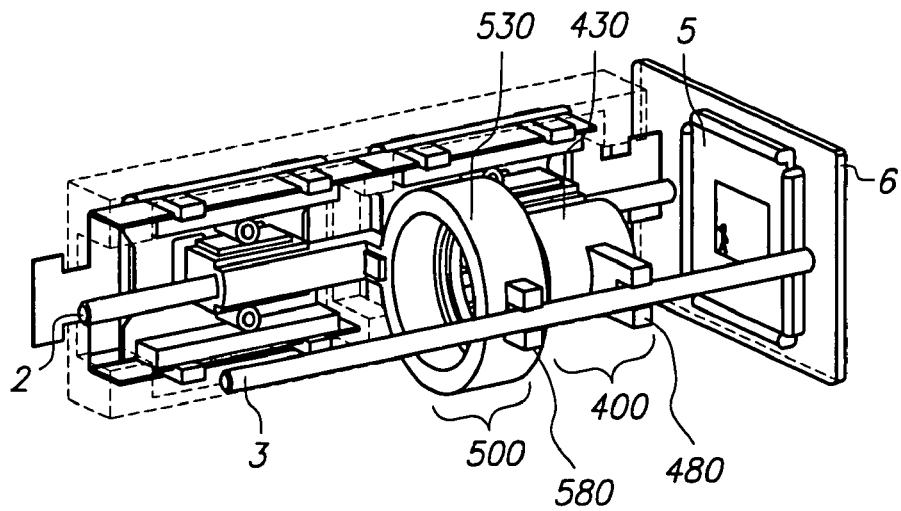
FIG. 3A is an isometric view from an optics-group side of an auto-focus and zoom module in accordance with some embodiments of the invention; a housing is rendered transparently to permit a clear view of the actuator elements.
Figure 3B:
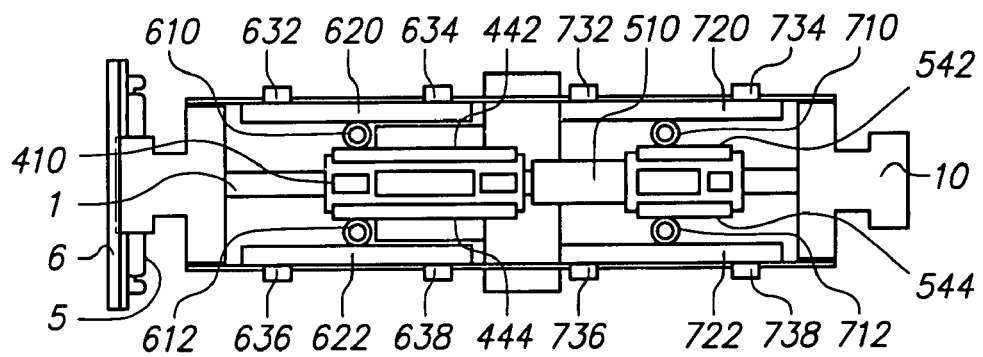
FIG. 3B is an elevation from an actuator side of internal parts of an auto-focus and zoom module in accordance with some embodiments of the invention.
Figure 3C:
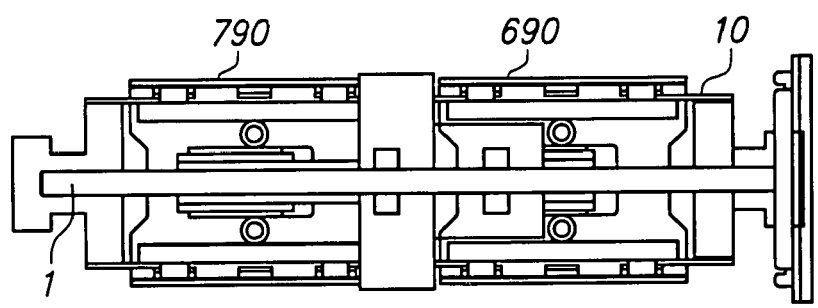
FIG. 3C is an elevation from an optics-group side of internal parts of an auto-focus and zoom module in accordance with some embodiments of the invention.

As shown in FIG. 3A, the image sensor 5 defines a plane. In the figures, this plane is perpendicular to the axes of the guide pins 2 and 3. Typically, a module is configured to provide an image to the image sensor 5 along an image vector parallel to these axes. The image sensor plane is also illustrated in FIG.

10. In each of the embodiments illustrated, an image vector delivered by the optics groups is substantially perpendicular to the image sensor plane.

Guide Pins

In each of the illustrated embodiments, parallel guide pins function as constraints along which the functional groups of the module are positioned. Some embodiments include a pair of guide pins, while some embodiments employ a different number of guide pins. Regardless of their number, the guide pins are typically mounted along a linear axis of the module to permit the optical groups to move relative to the image sensor.

Figure 2:
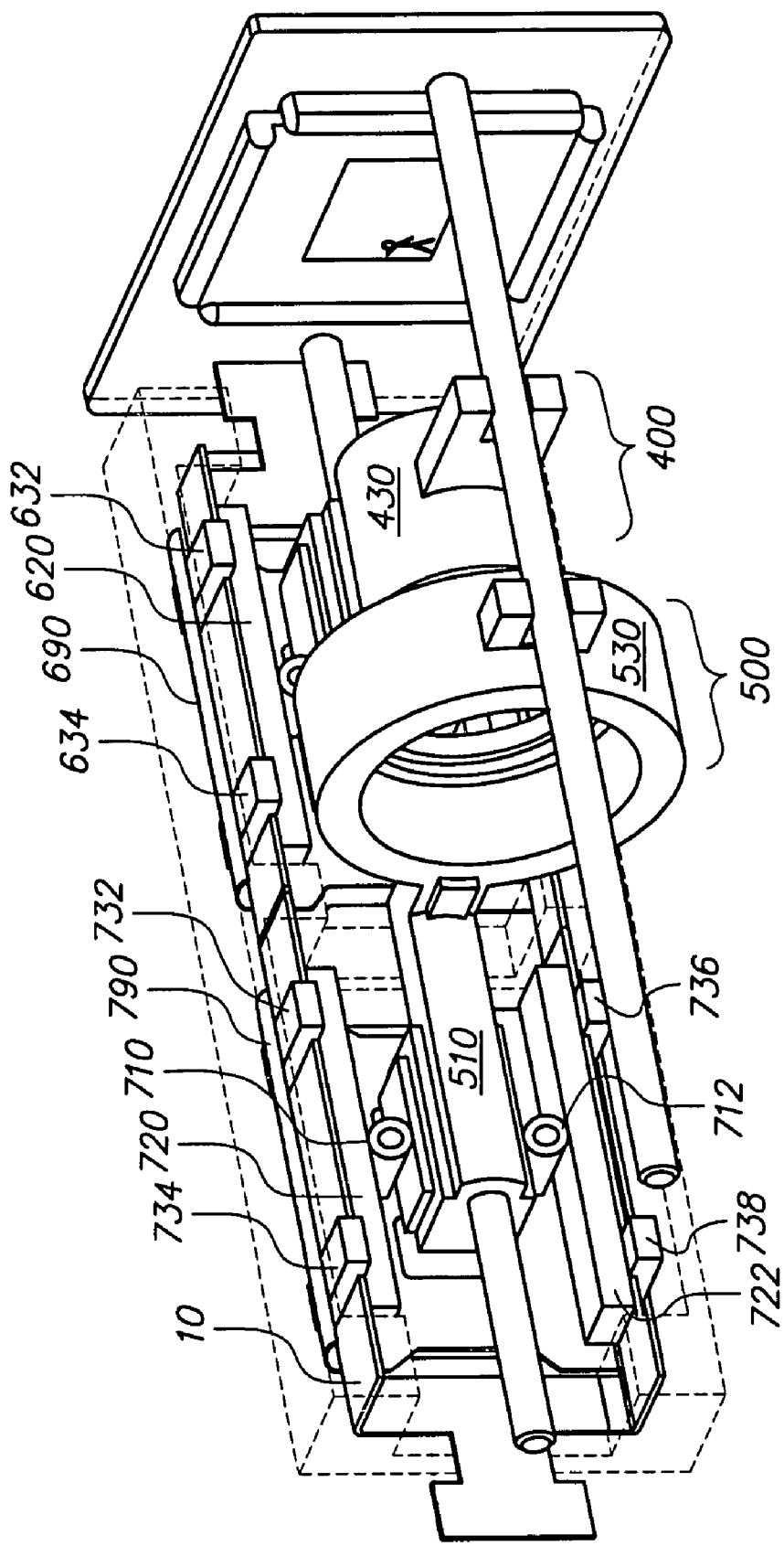
FIG. 2 is an isometric view from an optics-group side of an auto-focus and zoom module in accordance with some embodiments of the invention; an actuator housing is rendered transparently to permit a clear view of the actuator elements.

For example, some embodiments of the first type include a guide pin arrangement as shown in FIGS. 2 and 3A. In the illustrated embodiment of FIG. 3A, the optics groups 400 and 500 are slidably coupled to the guide pins 2 and 3. The optics group 400 is coupled to the primary guide pin 2 via the primary rear guide sleeve 410 (FIG. 1A), and to the secondary guide pin 3 via the rear guide slot 480. Similarly, the optics group 500 is coupled to the primary guide pin 2 via the primary front guide sleeve 510 (FIG. 2), and to the secondary guide pin 3 via the front guide slot 580. In the module shown, the primary guide pin 2 and the secondary guide pin 3 are aligned so that their axes are substantially parallel to each other. The couplings between the optics group 400 and 500 and the guide pins 2 and 3 permit the rear barrel 430 and the front barrel 530 to move along an axis parallel to that of the guide pins 2 and 3 relative to the image sensor 5. Typically, the guide pins 2 and 3 are coupled to a main housing (not shown) and an end guide plate (not shown). Preferably, the guide pins are coupled on opposite sides of the image vector of the image sensor 5. However, one skilled in the art will recognize that other configurations are possible.

Figure 7:
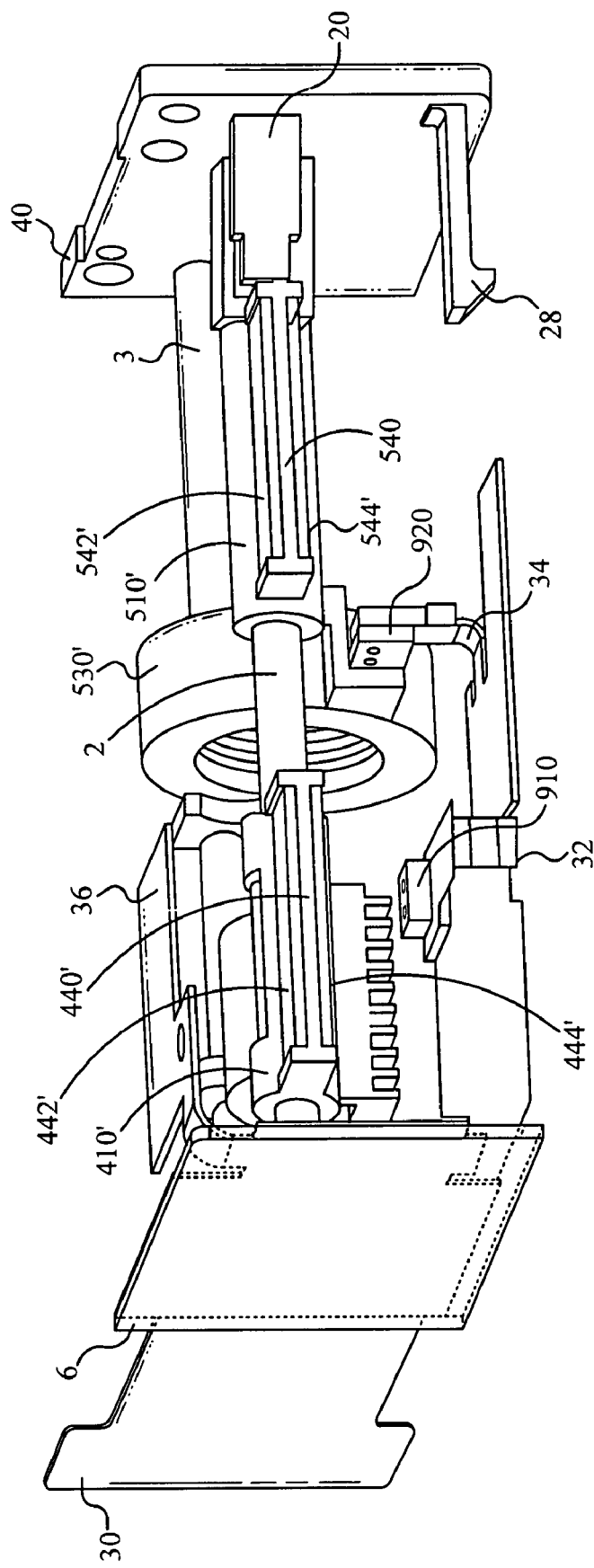
FIG. 7 is an isometric view from an actuator side of an auto-focus and zoom module in accordance with some embodiments of the invention.
Figure 8:
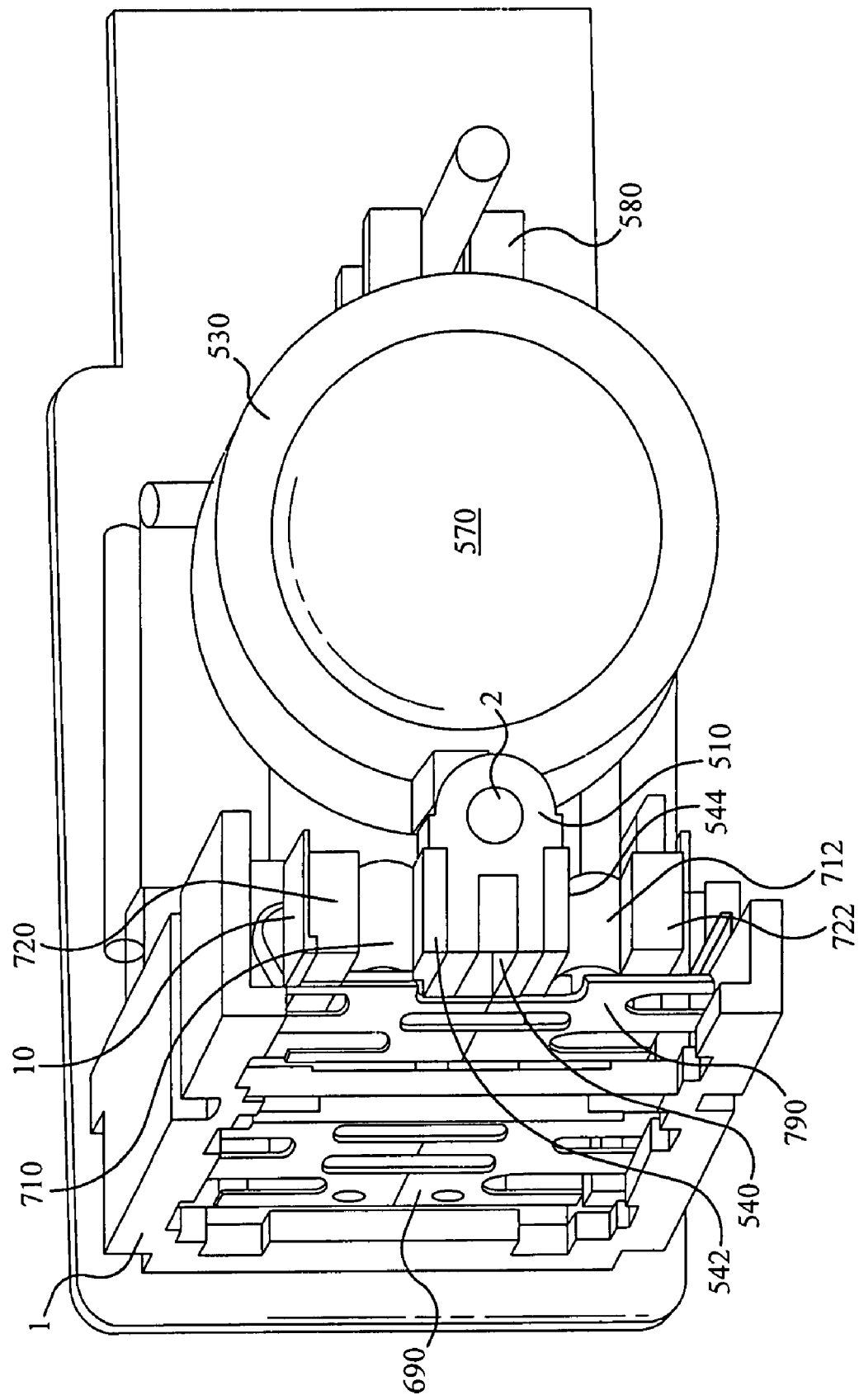
FIG. 8 is an isometric sectional view of an auto-focus and zoom module in accordance with some embodiments of the invention.

Some embodiments of the second type include a guide pin arrangement as shown in FIGS. 7 and 11. In the illustrated embodiment of FIG. 7, the optics groups are slidably coupled to the guide pins 2 and 3. The rear optics group is coupled to the primary guide pin 2 via the primary rear guide sleeve 410', and to the secondary guide pin 3 via the rear guide slot 480' (FIG. 10). Similarly, the front optics group is coupled to the primary guide pin 2 via the primary front guide sleeve 510', and to the secondary guide pin 3 via the front guide slot 580' (FIG. 8). In the module shown, the primary guide pin 2 and the secondary guide pin 3 are aligned so that their axes are substantially parallel to each other. The couplings between the front and rear optics groups and the guide pins 2 and 3 permit the rear barrel 430' and the front barrel 530' to move along an axis parallel to that of the guide pins 2 and 3 relative to the image sensor. Typically, the guide pins 2 and 3 are coupled to a main housing 100 (FIG. 11) and an end guide plate 40 (FIG. 7). Preferably, the guide pins are coupled on opposite sides of the image vector of the image sensor. However, one skilled in the art will recognize that other configurations are possible.

In some embodiments, the range of motion provided to the rear barrel by the guide pins is approximately 7 millimeters. In some embodiments, the range of motion provided to the front barrel by the guide pins is approximately 2 millimeters. Due to this range of motion, however, the guide pins of some embodiments affect the form factor of the module. Hence, some embodiments further include means for modifying and/or concealing the form factor of the module.

Prism Feature

For instance, some embodiments additionally include a prism feature (not shown). This feature allows the auto-focus and zoom module to be deposed and/or mounted in a variety of orientations. For instance, the dimension available to a particular implementation along the initial direction of an image vector is often limited such that the module is preferably deposed lengthwise in the vertical plane of an enclosure. This orientation allows the range of motion of the front and rear barrels along the guide pins, as described above, to be implemented in a device having a small width and/or depth form factor. For example, in a mobile phone implementation where a user will want to aim a camera at a desired image using the display as a viewfinder, the image vector is advantageously perpendicular to the display for usability purposes. However, the dimension of the device perpendicular to the display is often the thinnest dimension of a mobile phone.

In the relevant embodiments, a prism feature is mounted adjacent to the front barrel. The prism redirects the light from an image at an angle with respect to the front barrel. As described above, the front barrel typically houses a front lens group. The front lens group contains one or more front optical elements. Hence inclusion of a prism allows a module to be deposed in a variety of orientations within a device that is typically held at an angle with respect to the subject being viewed and/or photographed.

Actuators

In the various embodiments, actuators are included and constrained relative to the main housing of the module. As mentioned, in some embodiments, the actuators are housed within an actuator housing separate from, but coupled to, the main housing. In other embodiments, the actuators are coupled to the main housing.

An embodiment of the first type is shown in FIG. 2. The optics groups 400 and 500 are coupled to a vibrational actuator assembly. The vibrational actuator assembly (in general 10, 710-790, and 610-690 of FIG. 2) actuates and controls translation of an optics group via interaction between friction surfaces of the optics group and drive elements of the actuators. The actuators 620, 622, 720, and 722 are coupled to the actuator housing (dashed line) and maintained in a substantially stationary position relative to the main housing. This, combined with the freedom of the optics groups to move along the guide pins relative to the main housing, permits the actuators to move the optics groups relative to the main housing.

An embodiment of the second type is shown in FIG. 10. The front and rear optics groups are coupled to a vibrational actuator assembly. The vibrational actuator assembly (in general 10', 710'-722', and 610'-622' of FIG. 10, not including springs) actuates and controls translation of an optics group via interaction between friction surfaces of the optics group and drive elements of the actuators. As shown in FIG. 11, actuators 620', 622', 720', and 722' are coupled to the main housing 100 and maintained in a substantially stationary position relative to the main housing 100. This, combined with the freedom of the optics groups to move along the guide pins relative to the main housing, permits the actuators to move the optics groups relative to the main housing.

Housing

In embodiments of the present invention, a main housing performs a variety of functions. It mechanically supports and registers the guide pins, image sensor, and prism (if present) relative to each other. It provides a support structure for electronic communications elements, e.g. flexible printed circuit boards that permit communication between control circuitry, actuators, and sensors. It provides light insulation. It preferably provides some measure of shock damage prevention.

Figure 13:
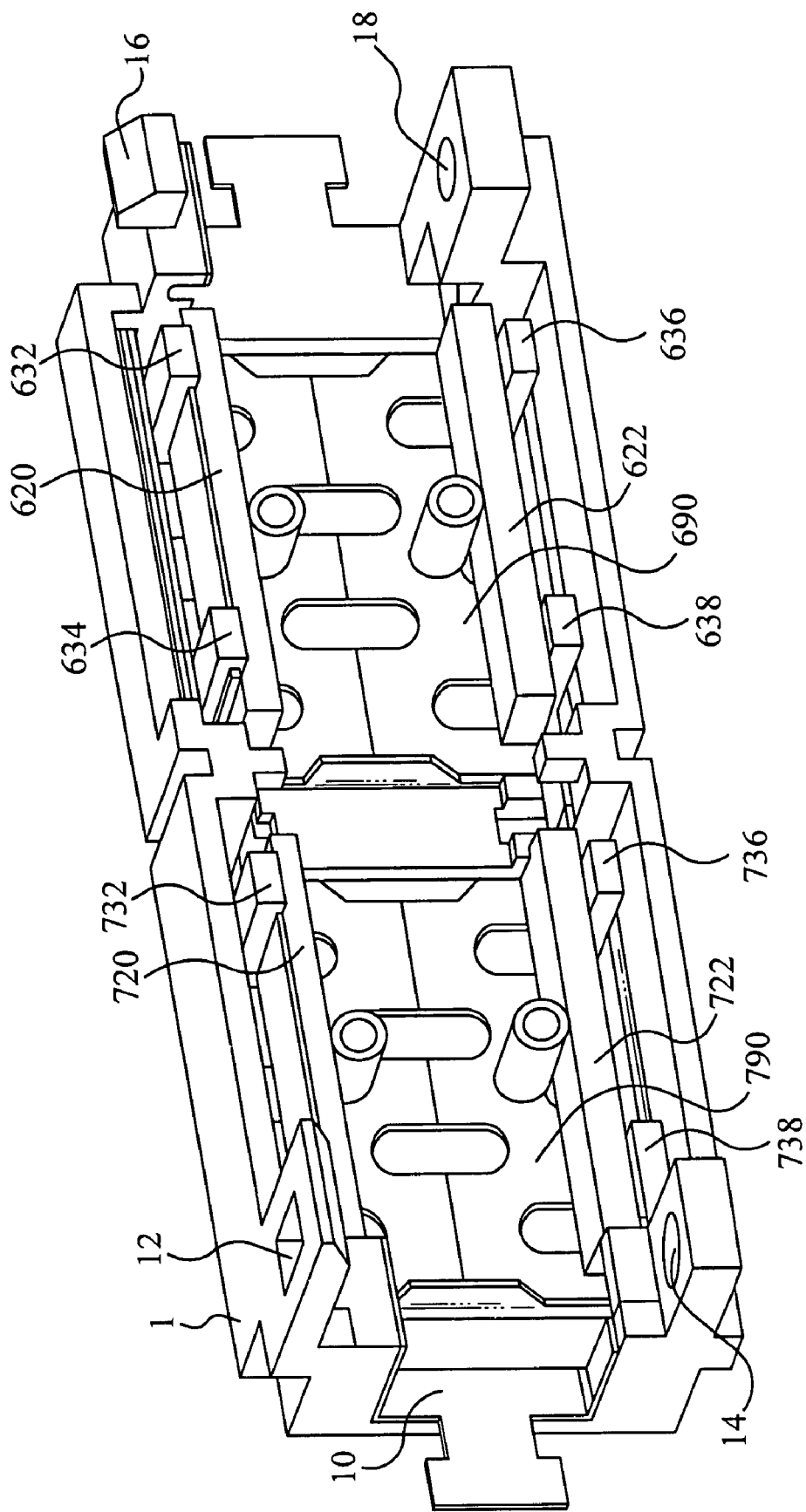
FIG. 13 is an isometric view from of an actuator assembly from an auto-focus and zoom module in accordance with some embodiments of the invention.

The main housing also provides for mechanical coupling and support of the actuator assembly. In the first type of embodiment, discussed above, this includes mechanically registering with and supporting a separate actuator housing that comprises actuators, communications elements and constraining elements. For example, the actuator housing 1 shown in FIG. 1A is constrained relative to a main housing (not shown) and thus stationary relative to the guide pins during operation. The actuator housing 1 is also shown in FIG. 13.

Figure 12:
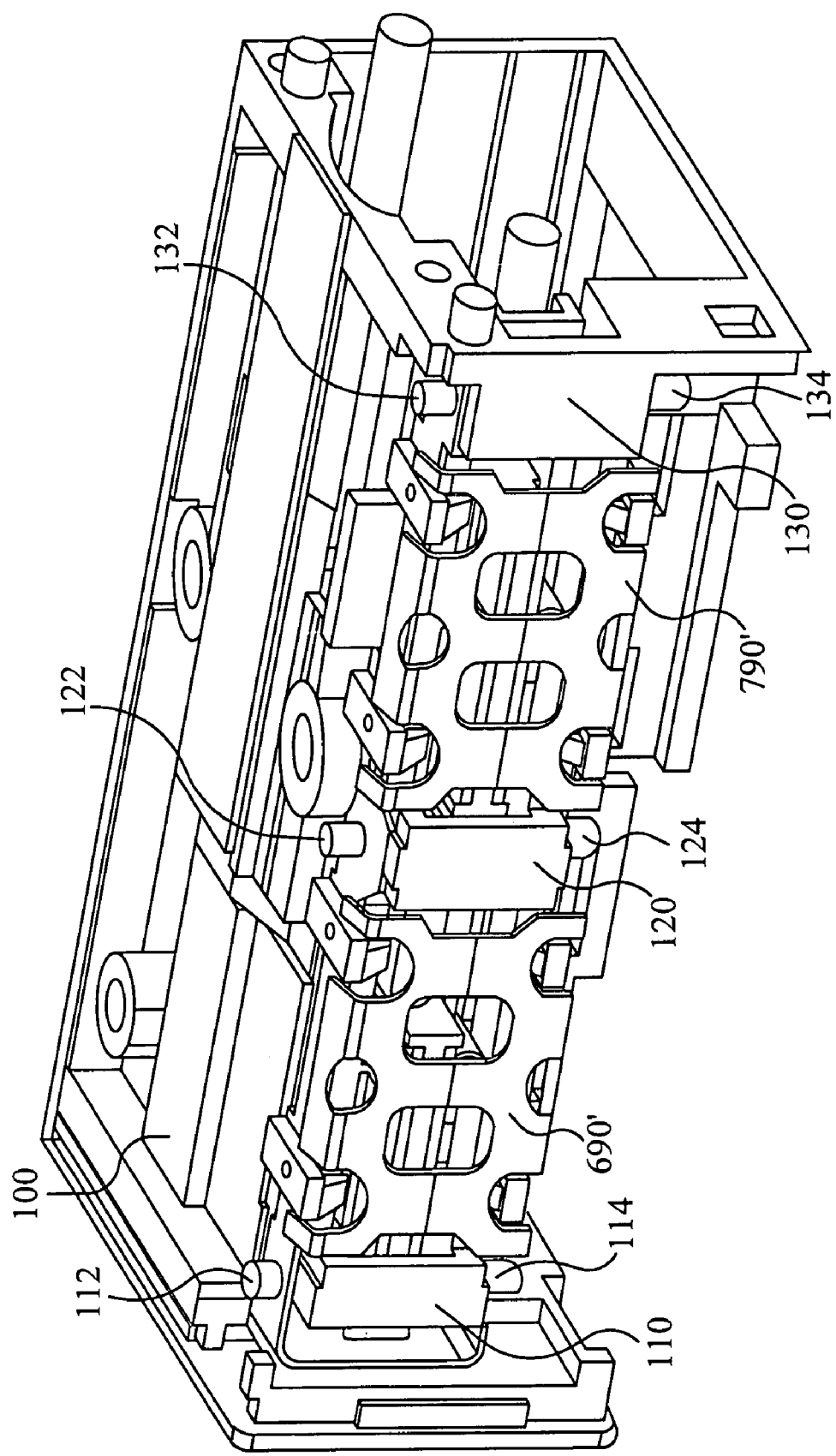
FIG. 12 is an isometric view from above of an auto-focus and zoom module in accordance with some embodiments of the invention; a main housing and actuator springs are included.

In the second type of embodiment, a main housing provides for mechanical coupling and support of the actuator assembly through specialized features for direct interface with an actuator assembly. For example, as shown in FIG. 12, the main housing 100 includes the interface features 112, 114, 122, 124, 132, and 134 that constrain the actuator assembly, maintaining it substantially stationary relative to the guide pins during operation.

Lens System

The general features of the lens systems provided in the embodiments of the present invention are consistent across the various types of embodiments. Certain aspects of the portions of these systems that interface with the guide pins and with the actuators do vary, as discussed in detail below.

Some general features of a rear optics group are illustrated in FIGS. 1A and 3A. The rear optics group 400 includes the rear barrel 430, the rear guide sleeve 410, and the rear guide slot 480. The rear barrel typically houses one or more lenses or other optical elements. The rear barrel 430 is a substantially cylindrical body with a central axis. The lenses of the rear barrel (not shown) are configured to direct light along the central axis of the rear barrel 430. The rear guide sleeve 410 is an elongated, substantially cylindrical body coupled to the rear barrel 430 so that the central axis of the rear barrel 430 and an axis of the rear guide sleeve 410 are substantially parallel. The rear guide slot 480 is a slotted feature configured to interface with a cylinder.

Some general features of a front optics group are illustrated in FIGS. 2 and 3A. The front optics group 500 includes the front barrel 530, the front guide sleeve 510, and the front guide slot 580. The front barrel typically houses a front lens. The front barrel 530 is a substantially cylindrical body with a central axis. A front lens (not shown) is preferably configured to direct light along the central axis of the front barrel 530. The front guide sleeve 510 is an elongated, substantially cylindrical body coupled to the front barrel 530 so that the central axis of the front barrel 530 and an axis of the front guild sleeve 510 are substantially parallel. The front guide slot 580 is a slotted feature configured to interface with a cylinder.

Constrained by Guide Pins

Referring now to FIG. 2, the front optics group 500 includes the front guide sleeve 510, which couples with the primary guide pin 2 (FIG. 3A). As illustrated, the front guide sleeve 510 is substantially elongated relative to the front barrel 530. Further, the front guide sleeve 510 is rigidly connected to the front barrel 530. This configuration prevents the front optics group 500 from rotating around an axis perpendicular to the axis of the primary guide pin 2, but permits rotation around the axis of the primary guide pin 2. Referring now to FIG. 1A, the rear optics group 400 includes the rear guide sleeve 410, which also couples with the primary guide pin 2. As illustrated, the rear guide sleeve 410 is substantially elongated relative to the rear barrel 430. Further, the rear guide sleeve 410 is rigidly connected to the rear barrel 430. This configuration prevents the rear optics group 400 from rotating around an axis perpendicular to the primary guide pin 2, but permits rotation around the axis of the guide pin.

Referring now to FIG. 3A, the front optics group 500 also includes the front guide slot 580, configured to couple with the secondary guide pin 3. The coupling between the guide slot 580 and the secondary guide pin 3 prevents the front optics group 500 from rotating around the axis of the primary guide pin 2. The coupling between the front optics group 500 and guide pins 2 and 3 permits the front optics group 500 to translate along the axis defined by the two guide pins, but not to move in either of the axes orthogonal to that axis.

The rear optics group 400 includes the rear guide slot 480, configured to couple with the secondary guide pin 3. The coupling between the guide slot 480 and the secondary guide pin 3 prevents the rear optics group 400 from rotating around the axis of the primary guide pin 2. The coupling between the rear optics group 400 and guide pins 2 and 3 permits the rear optics group 400 to translate along the axis defined by the two guide pins, but not to move in either of the axes orthogonal to that axis.

PRISM/Image Sensor

Driven via Actuators

In the various embodiments of the present invention the functional, e.g. optics, groups include friction surfaces. In some embodiments these friction surfaces are integrally formed with structural portions of the group. In other embodiments, the friction surfaces are portions of separate friction plates that are coupled to structural portions of the group.

The friction surfaces of each optical group are configured relative to one another to permit control of movement along the axes of the guide pins via application of frictional forces to the surfaces. Preferably, the friction surfaces, the optical lens, and the guide pin are configured and oriented relative to one another to reduce or substantially eliminate undesired forces in the directions perpendicular to the axes of the guide pins, and to produce smooth movement of the optical lens. Further, the friction surfaces and the guide sleeves are preferably oriented such that the long axes of the friction surfaces are constrained parallel to the axes of the guide pins.

Figure 4:
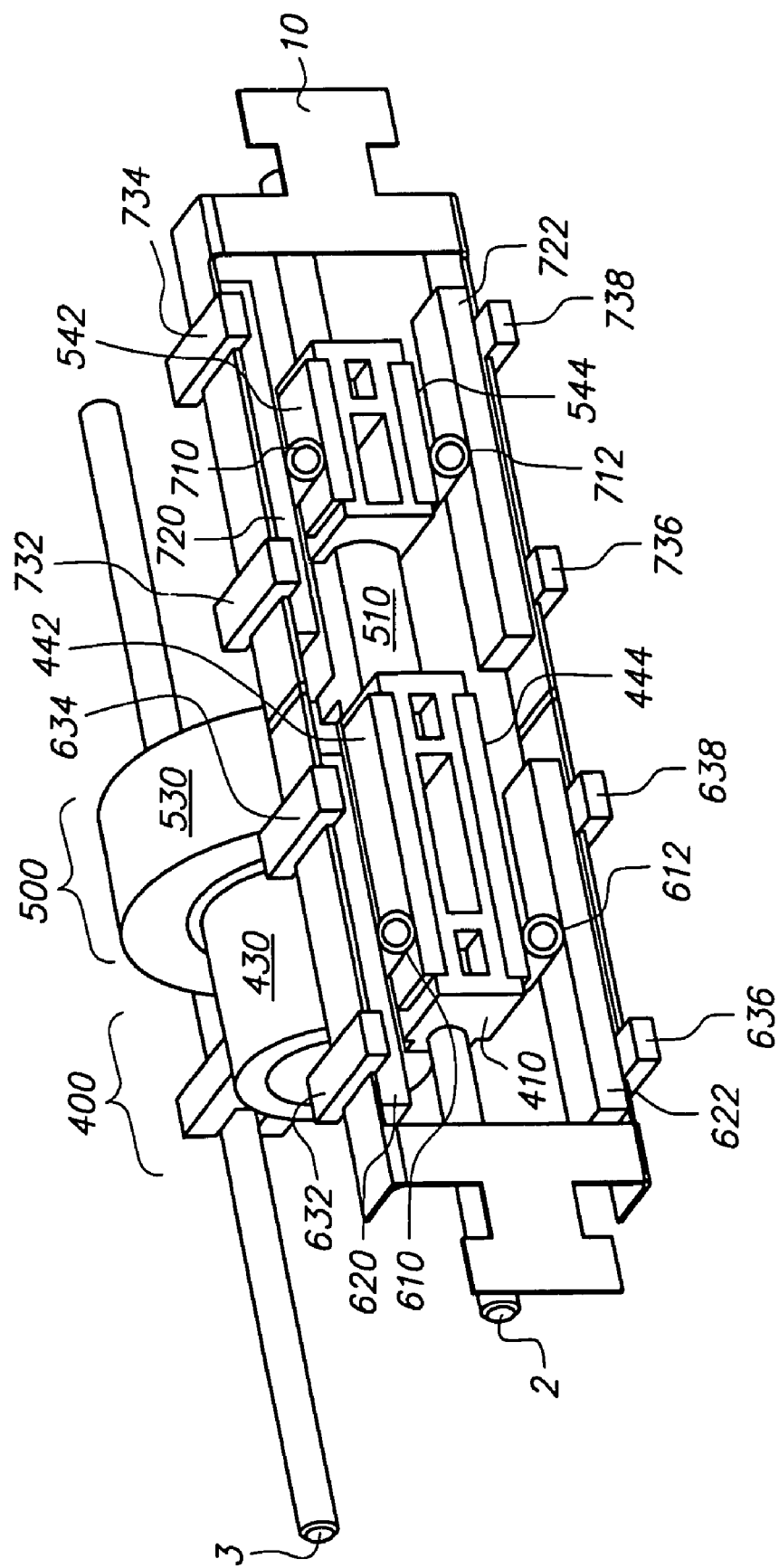
FIG. 4 is an isometric view from an actuator side of an auto-focus and zoom module in accordance with some embodiments of the invention.
Figure 5:
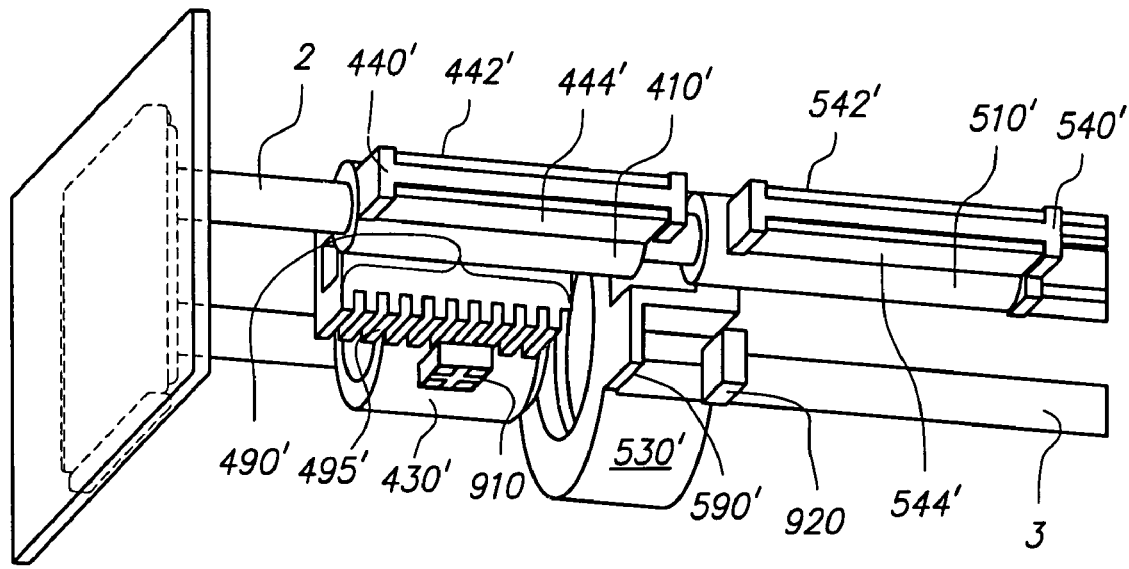
FIG. 5 is an isometric detail view of position sensing elements consistent with some embodiments of the invention.

For example, in FIG. 4 the long axes of the first and second rear friction surfaces 442 and 444 are parallel to both the primary guide pin 2 and the secondary guide pin 3, as shown in FIGS. 4 and 5. This alignment is maintained via the coupling between the friction surfaces and the guide sleeves. In FIG. 10, the long axes of the first and second front friction surfaces 542' and 544' are parallel to both the primary guide pin and the secondary guide pin 3, and to the front guide sleeve 510'.

Furthermore, friction plate mounting surfaces can be integrally formed with guide sleeves portions of the optics groups, or mounted to a bracket that is in turn mounted to the guide sleeve. Other configurations are possible.

In the illustrated embodiments, the embodiments that include an actuator housing are amenable primarily to integrated friction plate mounts. For example, FIG. 4 illustrates a rear guide sleeve 410 including, two integrated friction plate mounting surfaces, which are coupled with friction plates forming the friction surfaces 442 and 444 as shown. Similarly, the front guide sleeve 510 includes integrally formed friction plate mounting surfaces that mate to friction plates to form the friction surfaces 542 and 544. As shown in FIG. 8, the thickness of the mounting structure 540 is greater than that of the primary guide pin 2, permitting a highly degree of integral formation if desired.

Figure 9:
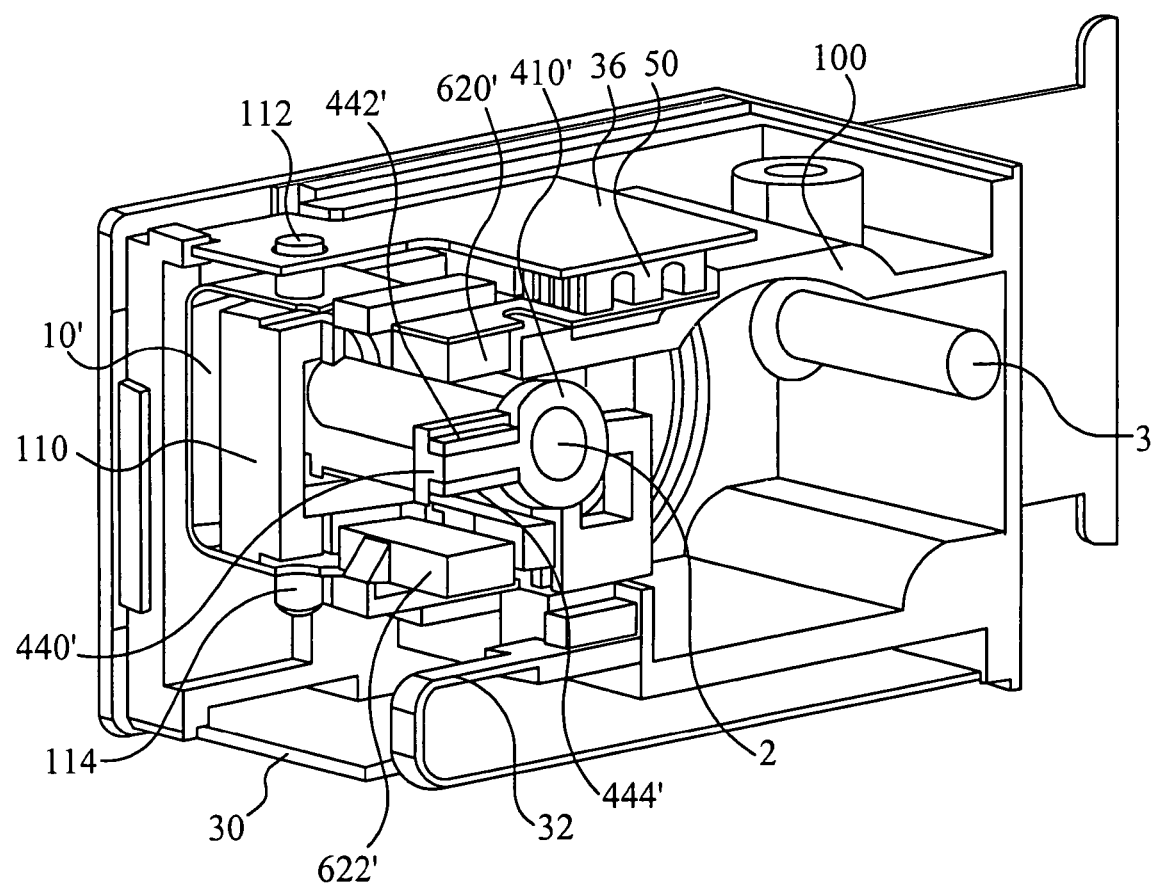
FIG. 9 is an isometric sectional view of an auto-focus and zoom module in accordance with some embodiments of the invention.

In contrast, the embodiments that include an actuator assembly mounted to the main housing are more amenable to construction via coupling a separate mounting surface to a guide sleeve. However, integrally formed approaches are preferred. Referring to FIG. 7, a rear guide sleeve 410' includes two integrated friction plate mounting surfaces, which are relatively close together compared with the embodiments of FIGS. 4 and 8. The friction plate mounting surfaces are coupled with friction plates forming the friction surfaces 442' and 444' as shown. Similarly, the front guide sleeve 510' includes integrally formed friction plate mounting surfaces that mate to friction plates to form the friction surfaces 542' and 544'. As shown in FIG. 9, the thickness of the mounting structure 440' is less than that of the primary guide pin 2, permitting a highly degree of integral formation if desired, but also lending itself to construction via multiple components.

Drive Mechanism

The drive mechanism of the embodiments of the present invention comprises frictional surfaces mounted on optics groups, actuator assemblies constrained in substantially stationary locations relative to the main housing of an optical module, and drive elements configured to transmit force from the actuator assembly to the frictional surface.

Friction Surfaces on Functional Modules

The drive mechanism of the embodiments of the present invention relies on frictional surfaces on the functional modules being positioned. In the illustrated embodiments, optical modules are positioned via interactions between actuators and frictional surfaces of frictional plates coupled to the modules.

A goal of the present invention is to provide increased stability during actuation by canceling any undesired forces generated by the interface of actuators with the friction surfaces. The configuration of the first and second friction plates of an optical group relative to one another contributes to the reduction of forcing perpendicular to the guide pins.

For example, as illustrated in FIG. 5, the first rear friction surface 442' is configured on an opposite face of the friction plate mounting bracket 440' from the second rear friction surface 444'. In another example, FIG. 4 illustrates the friction plates 442 and 444 configured on opposite sides of a mounting bracket integrally formed with the guide sleeve 410. Similarly, the FIG. 5 shows the first front friction plate 542 configured on an opposite face of the friction plate mounting bracket 540 from the second front friction plate 544. FIG. 4 illustrates the front friction surface 542 and 544 configured on opposite sides of a mounting bracket integrally formed with the guide sleeve 510.

In both figures, each illustrating a different type of embodiment, each group has two friction surfaces configured on opposite faces of a parallelepiped. This configuration represents one class of embodiments where the friction surfaces of a group are directed in opposite directions of an axes perpendicular to the primary guide pin 2. Here the 'direction' of a friction surface refers to the direction of its normal vector. Similarly, the 'direction' of a friction plate refers to the normal vector of its friction surface that is exposed for interface with an actuator.

The opposed configuration of the friction surfaces in FIGS. 4 and 7 is but one exemplary embodiment of the present invention's approach to friction surfaces. In some embodiments, such as those illustrated, orienting the friction surfaces in opposite directions relative to one another at a straight angle reduces the side forces. Thus, with proper operation of the actuator, substantially all forces generated by on the first friction surface along vectors perpendicular to the guide pins can be canceled by opposite forces generated by at the second friction surface. For example, control of the actuator can result in substantially zero force being applied to the functional group along vectors rotational around the axis of the primary guide pin.

In other embodiments, the friction surfaces are oriented relative to one another at an obtuse angle. In these embodiments, the some component forces can be generated along an axis perpendicular to the guide pins 2 and 3. Preferably these forces are aligned along a direction from the primary guide pin 2 to the secondary guide pin 3 to reduce their effect on the reliability of the system. However, this configuration does produce some side forces on the guide pin and requires that the pins have more rigidity. For at least this reason, these configurations are not preferred.

In addition, the positioning of the friction surfaces relative to the primary guide pin determines in part the level of side forcing generated. The center of mass of the optics modules lies between the guide pins 2 and 3. The friction surfaces, 442, 444, 542, and 544 in the first type of embodiment as shown in FIG. 4 as well as 442', 444', 542', and 544' in the second type of embodiment as shown in FIG. 7, lie off-center to permit full range of motion of the optics groups. Thus, driving the optics modules at the friction surfaces tends to introduce a torque. However, configuring the groups so that the long axes of the friction plates (and surfaces) are aligned or nearly aligned with the primary guide pin 2 reduces the amount of torque on the guide pins.

For example, as illustrated in FIG. 1A, the first front friction surface 542, the second front friction surface 544, and the primary guide pin 2 are configured so that their long axes are aligned. The optics group is configured so that a single plane is substantially tangent to an edge of each of the friction plates and to a surface of the primary guide pin 2. This relative positioning of the guide pin 2 relative to the friction surfaces 542 and 544 is most clearly illustrated in FIG. 8. This single-plane tangency is exhibited primarily in embodiments of the first type, e.g. those shown in FIGS. 1B, 2, and 3A-3C.

In some of these embodiments, a virtual line drawn between a point of the first friction surface, a point of the second friction surface, and a point of the primary guide pin is a straight line for at least one point from each at all times. This holds for both the front optics group 500 and the rear optics group 400. For example, in FIG. 1A some portion of the first rear friction plate 442, the second rear friction plate 444, and the primary guide pin 2 are coplanar. A similar configuration can be seen in FIGS. 2 and 3A, though the pertinent portions of these figures are not all labeled.

FIG. 4 illustrates another version of this type of embodiment. As illustrated, the first front friction surface 542 and the second front friction surface 544 along with the integrated mounting bracket of the front guide sleeve 510 form a parallelepiped that has two opposing friction surfaces. Also, the first rear friction surface 442 and the second rear friction surface 444 along with the integrated mounting bracket of the rear guide sleeve 410 form a parallelepiped that has two opposing friction surfaces. In both the front guide sleeve 510 and the rear guide sleeve 410, the parallelepiped formed intersects the primary guide pin 2 when the group is mounted. In this configuration, for certain sets of points with one point from each of the first rear friction surface 442, the second rear friction surface 444, and the primary guide pin 2, the set of points are coplanar. However, the long axes of the guide pin 2 and the first rear friction surface 442 and second rear friction surface 444 are not coplanar. Similarly, and as shown in FIG. 5, certain sets of points with one point from each of the first front friction plate 542, the second front friction surface 544, and the primary guide pin 2, are coplanar. However, the long axes of the guide pin 2 and the first 542 and second 544 front friction surface are not coplanar. Instead, a line drawn between the various axes forms a triangle. In preferred versions of these embodiments the triangle has a minimum area possible for a given spacing between the first and second friction surfaces.

In other embodiments, the primary guide pin and the friction surfaces are aligned differently. For example, in some embodiments, no virtual line drawn between any point of the first friction surface, the second friction surface, and the primary guide pin forms a straight line, but the virtual line does form a triangle. FIG. 9 illustrates such a configuration. The first rear friction surface 442' and the second rear friction surface 444' are configured on opposite sides of the mounting bracket 440, forming a parallelepiped with opposing friction surfaces. The parallelepiped and the primary guide pin 2 do not intersect. Thus, for no set of points with one point from each of the first rear friction surface 442', the second rear friction surface 444', and the primary guide pin 2, is the set of points coplanar. However, there are sets of points for which a line between such points forms a triangle. As shown in FIG. 7, the first front friction surface 542', second front friction surface 544, and primary guide pin 2 are similarly related. In preferred versions of these embodiments the triangle has a minimum area possible for a given spacing between the first and second friction surfaces.

Drive Elements Coupled to the Friction Surfaces

The actuator assemblies mentioned above include drive elements configured to interact with the friction surfaces of the functional groups. For example, as shown in FIG. 4, the actuator assembly is configured such that a first front drive element 710 interacts with a first friction surface 542. Further a second front drive element 712 interacts with the second friction surface 544. In addition, a first rear drive element 610 interacts with a first rear friction surface 442 and a second rear drive element 612 interacts with a second rear friction surface 444. The remainder of the vibrational actuator assembly is configured to effect and control movement of the drive elements to apply frictional forces to the friction surfaces of the front 500 and rear 400 optics groups.

As shown in FIG. 10 the actuator assembly is configured such that a first front drive element 710' interacts with a first front friction surface 542'. Further a second front drive element 712' interacts with a second front friction surface 544'. In addition, a first rear drive element 610' interacts with a first rear friction surface 442' and a second rear drive element 612' interacts with a second rear friction surface 444'. The remainder of the vibrational actuator assembly is configured to effect and control movement of the drive elements to apply frictional forces to the friction surfaces of the front and rear optics groups.

The first and second friction surfaces of each functional, e.g. optical, group are coupled to the functional group as set forth above. Further, the first and second friction surfaces are configured relative to one another to permit the control of movement of the group along the guide pin axes via application of the friction surface. Thus, the configuration of the drive elements to apply frictional forces to the friction surfaces permits the actuator to move, and to control movement of, the front optics group and the rear optics group. The type of movement over which the vibrational actuator preferably exercises dynamic control is translation along the axes of the primary guide pin 2 and the secondary guide pin 3. However, as mentioned earlier, the actuator can be configured to apply substantially zero rotational force around the primary axis of the primary guide pin 2.

The drive elements 710, 712, 610, and 612 as well as 710', 712', 610', and 612' are preferably hollow cylindrical bodies, configured to contact their respective friction surfaces along a tangent portion of an outer cylindrical surface. Preferably the drive elements are constructed from high friction ceramic materials capable of bonding with the piezoelectric (vibrational) actuators. In some embodiments, the drive elements are integrally formed with the piezoelectric actuators. Preferably, the drive elements are constructed similarly to the drive pads disclosed and discussed in U.S. patent application Ser. No. 10/173,766 of Johansson, filed Jun. 19, 2002 and entitled "Near-resonance electromechanical motor", and in U.S. patent application Ser. No. 10/737,791 of Mattsson, filed Dec. 18, 2003 and entitled "Electromechanical motor and method of assembling therefore."

Vibrational Actuators Coupled to the Housing

An actuator assembly includes piezoelectric elements coupled to the drive elements. Referring now to FIG. 4, the first rear drive element 610 is coupled to the first rear piezoelectric element 620. The second rear drive element 612 is coupled to the second rear piezoelectric element 622. The first front drive element 710 is coupled to the first front piezoelectric element 720. The second front drive element 712 is coupled to the second front piezoelectric element 722. Preferably, each of the piezoelectric elements 620, 622, 720, and 722 is in the form of a parallelepiped. Preferably, the piezoelectric elements are constructed from piezoelectric materials, such as certain ceramics. In some embodiments, non-piezoelectric elements that are electrically actuated to vibrate are used.

Similarly, in FIG. 10, the first rear drive element 610' is coupled to the first rear piezoelectric element 620'. The second rear drive element 612' is coupled to the second rear piezoelectric element 622'. The first front drive element 710' is coupled to the first front piezoelectric element 720'. The second front drive element 712' is coupled to the second front piezoelectric element 722'. Preferably, each of the piezoelectric elements 620', 622', 720', and 722' is in the form of a parallelepiped. Preferably, the piezoelectric elements are constructed from piezoelectric materials, such as certain ceramics. In some embodiments, non-piezoelectric elements that are electrically actuated to vibrate are used.

Most preferably, the piezoelectric elements are constructed similarly to the active portions of the drive elements disclosed and discussed in U.S. patent application Ser. No. 10/173,766 of Johansson, filed Jun. 19, 2002 and entitled "Near-resonance electromechanical motor". and in U.S. patent application Ser. No. 10/737,791 of Mattsson, filed Dec. 18, 2003 and entitled "Electromechanical motor and method of assembling therefore."

Each of the piezoelectric elements is coupled to a flexible actuator board and to a rigid mount. Preferably, dual-function couplings are used to couple a piezoelectric element to both the mount and the actuator board. In a first type of embodiment, the actuator board is mounted to an actuator housing. For example, referring to FIG. 13, the first rear piezoelectric element 620 is coupled to the actuator board 10 via the couplings 632 and 634. In FIG. 4 this coupling is shown from the other side, with the actuator housing 1 excluded. The couplings 632 and 634 secure both the resilient actuator board 10 and the piezoelectric element 620 to the actuator housing 1. Preferably, each coupling is flexible, permitting movement of the piezoelectric and accompanying movement of the resilient actuator board. In similar fashion, the second rear piezoelectric element 622 is coupled to the actuator board 10 via the couplings 636 and 638. The couplings 636 and 638 secure both the resilient actuator board 10 and the piezoelectric element 622 to the actuator housing 1. Similarly, FIG. 13 illustrates the second front piezoelectric element 722 coupled to the actuator board 10 via the couplings 736 and 738. FIG. 4 illustrates the couplings 732 and 734, which similarly secure both the resilient actuator board 10 and the piezoelectric element 720 to the actuator housing 1 (FIG. 13).

In a second type of embodiment the actuator board is mounted to the main housing. For example, as shown in FIG. 11, the first rear piezoelectric element 620' is coupled to the actuator board 10' via the couplings 632' and 634'. The couplings 632' and 634' secure both the resilient actuator board 10' and the piezoelectric element 620' to the main housing 100. As illustrated, special features of the main housing 100 are adapted to retain the actuator board 10'. Preferably, each coupling is flexible, permitting movement of the piezoelectric and accompanying movement of the resilient actuator board. In similar fashion, the second rear piezoelectric element 622' is coupled to the actuator board 10' via the couplings 636' and 638'. The couplings 636' and 638' secure both the resilient actuator board 10' and the piezoelectric element 622' to the main housing 100. Similarly, the second front piezoelectric element 722' is coupled to the actuator board 10' via the couplings 736' and 738'. The couplings 732' and 734' similarly secure both the resilient actuator board 10' and the piezoelectric element 720' to the main housing 100.

Springs Provide Normal Force

Another factor in moderating interaction between the piezoelectric elements and the friction plates is the magnitude of normal force between the drive elements and the friction plates. Preferably, a base level of normal force is generated via a clip spring configured to force an opposing pair of piezoelectric elements toward one another, deforming the actuator bracket, and increasing the normal force between the friction plates and drive elements.

For example, the clip springs 690 and 790 are shown in FIG. 2. The clip spring 690 applies force to the first rear piezoelectric element 620 and the second rear piezoelectric element 622 (not shown in FIG. 2), deforming the resilient actuator board 10 and forcing the piezoelectric elements 620 and 622 towards one another. Similarly, the clip spring 790 applies force to the piezoelectric elements 720 and 722, forcing the elements towards one another and deforming the resilient actuator board 10. The springs 690 and 790 urge the drive elements against the friction plates, generating a normal force to ensure adequate frictional forces between the elements.

Specifically, the spring 690 deforms the resilient actuator board 10 to urge the first rear piezoelectric element 620 and the second rear piezoelectric element 622 towards one another, thus urging the first rear drive element 410 against the first rear friction plate 442 and the second rear drive element 612 against the second rear friction plate 444. The friction plates are constrained by their actuator housing to form a substantially rigid parallelepiped. The spring 690 simultaneously applies force to the piezoelectric elements on either side of the parallelepiped, forcing them toward it and forcing the drive elements against its friction surfaces.

The clip springs 690' and 790' are shown in FIG. 12. The clip spring 690' applies force to the first rear piezoelectric element 620' and the second rear piezoelectric element 622' (both shown in FIG. 11), deforming the resilient actuator board 10' and forcing the piezoelectric elements 620' and 622' towards one another. Similarly, the clip spring 790' applies force to the piezoelectric elements 720' and 722', forcing the elements towards one another and deforming the resilient actuator board 10'. The springs 690' and 790' urge the drive elements against the friction plates, generating a normal force to ensure adequate frictional forces between the elements.

Specifically, the spring 690' deforms the resilient actuator board 10' to urge the first rear piezoelectric element 620' and the second rear piezoelectric element 622' towards one another, thus urging the first rear drive element 410' against the first rear friction plate 442' and the second rear drive element 612' against the second rear friction plate 444'. The friction plates are constrained by their actuator housing to form a substantially rigid parallelepiped. The spring 690' simultaneously applies force to the piezoelectric elements on either side of the parallelepiped, forcing them toward it and forcing the drive elements against its friction surfaces.

Preferably the springs 690, 790, 690' and 790' are formed of a resilient material such as metal. In the preferred embodiment, the spring 690 and the spring 790 are identically configured and apply substantially the same force to the sets of friction surfaces of their respective functional groups. Similarly, the spring 690' and the spring 790' are preferably identically configured and apply substantially the same force to the sets of friction surfaces of their respective functional groups. However, the springs of 690 and 790 of the first type of embodiment are preferably different than the springs 690' and 790' of the second type of embodiment. One reason for this is the differing thickness of the friction-surface-bearing parallelepiped between the first type and second type of embodiment. In some embodiments, springs are tuned to apply different forces to different functional groups.

The piezoelectric elements are preferably configurable to operate at a resonant frequency having at least two node points. In preferred embodiments, the couplings discussed above constrain each piezoelectric element at its two node points. The piezoelectric elements are controlled via signals sent through the resilient actuator board 10 or 10', which preferably comprise resilient printed circuit board (PCB).

Actuator Control

Preferably, the module includes a control element (not shown), which is configured to receive data from the position sensor (discussed below) and to operate the vibrational actuators to position the functional element. In the first type of embodiments, the control element sends signals through the actuator board 10 to control the piezoelectric elements 620, 622, 720, and 722. In the second type of embodiments, the control element sends signals through the actuator board 10' to control the piezoelectric elements 620', 622', 720', and 722'. The piezoelectric elements are preferably controlled to operate at resonant frequencies that have node points at the locations of constraint.

For example, in the first type of embodiment, the first rear piezoelectric 620 would operate at a resonant frequency that has node points at the location of the couplings 632 and 634. Similarly, the second rear piezoelectric 622 would operate at a resonant frequency that has node points at the location of the couplings 636 and 638. The front piezoelectric elements 720 and 722 would similarly relate to the couplings 732, 734 and 736, 738, respectively.

Referring to FIG. 4, the resonant-driven piezoelectric elements 620, 622, 720, and 722 engage and disengage the drive elements 610, 612, 710, and 712, with the friction plates 442, 444, 542, and 544, respectively. As discussed above, the configuration of the friction plates of a given optical group, e.g. the plates 442 and 444 of the rear optics group 400, relative to one another permits the actuator system to drive the group along the primary guide pin 2 substantially without any side forcing of the guide pin.

In the second type of embodiment, the first rear piezoelectric 620' would operate at a resonant frequency that has node points at the location of the couplings 632' and 634'. Similarly, the second rear piezoelectric 622' would operate at a resonant frequency that has node points at the location of the couplings 636' and 638'. The front piezoelectric elements 720' and 722' would similarly relate to the couplings 732', 734' and 736', 738', respectively.

Referring to FIG. 10, the resonant-driven piezoelectric elements 620', 622', 720', and 722' engage and disengage the drive elements 610', 612', 710', and 712', with the friction plates 442', 444', 542', and 544', respectively. As discussed above, the configuration of the friction plates of a given optical group, e.g. the plates 442' and 444' of the rear optics group, relative to one another permits the actuator system to drive the group along the primary guide pin 2 substantially without any side forcing of the guide pin.

In both types of embodiment, the control element preferably drives the opposing piezoelectric elements that interact with a given group, e.g. the first rear piezoelectric element 620 and the second rear piezoelectric element 622 that drive the rear optics group 400, in a manner selected to reduce or minimize side forcing. The front piezoelectric elements are also preferably controlled to minimize generation of forces perpendicular to the axes of the guide pins.

Position Sensing, Control and Referencing

In both types of embodiments, the present invention includes position sensing, referencing and control components adapted to track movement of the optics groups and control the actuators to effect movement of the optics groups via mechanisms discussed above. The details of the position sensing and referencing operation are discussed below.

Actuator Mounting and Configuration Details

As mentioned above, the embodiments of the present invention include at least two types differentiated by their approach to mounting an actuator assembly to a module chassis. This section discusses these two types, their structure, and their function, in greater detail.

Actuator Housing—Main Housing

The first type of embodiment, shown generally in FIGS. 1-4, 8, and 13, includes both a main housing (not shown) and an actuator housing 1. The actuator housing 1 is preferably rigidly coupled to the main housing, which also couples the guide pins 2 and 3, and the image sensor 6. Thus, the main housing registers the actuator housing 1, guide pins 2 and 3, and the image sensor 6 to one another.

Friction Surface—Optics Group

As described above, the optics groups 400 and 500 include guide sleeves 410 and 510 and guide slots 480 and 580 configured to register the functional optics portion, e.g. 570 of FIG. 8, relative to the guide pins 2 and 3. The optics groups further include specialized mounting surfaces configured to permit coupling of friction plates thereto and thus provide for optics groups with frictional surfaces thereon. In other embodiments, the frictional surfaces are integrally formed with the optics groups.

Specifically, as shown in FIG. 4, the optics groups each include friction surfaces. Preferably, the friction surfaces are each embodied in separate friction plates. Specifically, the rear optics group 400 includes the first rear friction surface 442 and the second rear friction surface 444. The front optics group 500 includes the first front friction surface 542 and the second front friction surface 544. The friction surfaces 442 and 444 belong to friction plates coupled with the functional portion of the rear optics group, e.g. the rear barrel 430 and its accompanying lens. Similarly, the friction surfaces 542 and 544 belong to friction plates coupled with the functional portion of the front optics group, e.g. the front barrel 530 and its accompanying lens 570 (FIG. 8).

The friction surfaces are coupled to the functional groups through the guide sleeves, which constrain the surfaces relative to the guide pins. FIG. 8 illustrates the cross-sectional construction of the guide-sleeve-friction-plate interaction. As shown, the guide sleeve 510 is integrally formed with the plate mounting bracket 540, which couples the plates, thus registering the friction surfaces 542 and 544 with the lens 570 through the preferably rigid coupling between the components of the front optics group 500.

Actuator Assembly—Optics Group

The actuator assembly and optics groups are coupled through drive elements. As shown in FIG. 8, the actuator assembly is configured such that a first front drive element 710 interacts with a first front friction surface 542. Further a second front drive element 712 interacts with the second front friction surface 544.

The remainder of the vibrational actuator assembly is configured to effect and control movement of the drive elements to apply frictional forces to the friction surfaces of the front 500 and rear 400 optics groups.

Preferably, as illustrated, the actuator assembly includes piezoelectric elements coupled to the drive elements. As shown in FIG. 1A, the first rear drive element 610 is coupled to the first rear piezoelectric element 620. Preferably, each of the piezoelectric elements is in the form of a parallelepiped. Preferably, the piezoelectric elements are constructed from piezoelectric materials, such as certain ceramics. Preferably the drive elements are constructed of high-friction ceramics. In some embodiments, the drive elements and the piezoelectric elements are integrally formed.

Most preferably, the piezoelectric elements are constructed similarly to the active portions of the drive elements disclosed and discussed in U.S. patent application Ser. No. 10/173,766 of Johansson, filed Jun. 19, 2002 and entitled "Near-resonance electromechanical motor". and in U.S. patent application Ser. No. 10/737,791 of Mattsson, filed Dec. 18, 2003 and entitled "Electromechanical motor and method of assembling therefore."

Actuator—Actuator Housing

Each of the piezoelectric elements is coupled to a flexible actuator board 10 and to an actuator housing 1. Preferably, dual-function couplings are used to couple a piezoelectric element to both the actuator board 10 and to the actuator housing 1. Preferably, each coupling is flexible, permitting movement of the piezoelectric and accompanying movement of the resilient actuator board. Preferably the couplings are located at points on the piezoelectric elements that are node points under preferred resonant operating conditions.

Referring to FIG. 13, the first rear piezoelectric element 620 is coupled to the actuator board 10 via the couplings 632 and 634. The couplings 632 and 634 secure both the resilient actuator board 10 and the piezoelectric element 620 to the actuator housing 1.

In similar fashion, the second rear piezoelectric element 622 is coupled to the actuator board 10 via the couplings 636 and 638. The couplings 636 and 638 secure both the resilient actuator board 10 and the piezoelectric element 622 to the actuator housing 1. Similarly, the second front piezoelectric element 722 coupled to the actuator board 10 and actuator housing 1 via the couplings 736 and 738.

Actuator Housing—Main Housing

Still referring to FIG. 13, the actuator housing 1 includes features for interface with a main housing (not shown). Specifically, the actuator housing 1 includes the front interface latch recess 12, the rear latch 16, the front reference aperture 14 and the rear reference aperture 18.

The entirety of the actuator housing 1 is preferably constructed of a rigid material, thus registering the front interface latch recess 12, the rear latch 16, the front reference aperture 14 and the rear reference aperture 18 relative to one another. The main housing, in addition to registering the guide pins 2 and 3, and the image sensor 6 to one another, further registers the complement features of the front interface latch recess 12, the rear latch 16, the front reference aperture 14 and the rear reference aperture 18. Thus, thru its rigid coupling to the main housing, the actuator housing 1 is preferably registered to the optics groups coupled to the guide pins 2 and 3.

Multi-Function Main Housing Chassis

The second type of embodiment, shown generally in FIGS. 4-7, and 9-12, includes a multi-function main housing 100. The main housing 100 couples the guide pins 2 and 3, the image sensor 6, as well as the actuator assembly. Thus, the main housing registers the actuator assembly, guide pins 2 and 3, and the image sensor 6 to one another.

Friction Surface—Optics Group

As described above, the optics groups include guide sleeves 410' and 510' and guide slots 480' and 580' configured to register the functional optics portion, e.g. within the barrels 430' and 530' of FIG. 10, relative to the guide pins 2 and 3. The optics groups further include specialized mounting surfaces configured to permit coupling of friction plates thereto and thus provide for optics groups with frictional surfaces thereon. In other embodiments, the frictional surfaces are integrally formed with the optics groups.

Specifically, as shown in FIG. 7, the optics groups each include friction surfaces. Preferably, the friction surfaces are each embodied in separate friction plates. Specifically, the rear optics group includes the first rear friction surface 442' and the second rear friction surface 444'. The front optics group includes the first front friction surface 542' and the second front friction surface 544'. The friction surfaces 442' and 444' belong to friction plates coupled with the functional portion of the rear optics group, e.g. the rear barrel 430' and its accompanying lens. Similarly, the friction surfaces 542' and 544' belong to friction plates coupled with the functional portion of the front optics group, e.g. the front barrel 530' and its accompanying lens.

The friction surfaces are coupled to the functional groups through the guide sleeves, which constrain the surfaces relative to the guide pins. FIG. 9 illustrates the cross-sectional construction of the guide-sleeve-friction-plate interaction. As shown, the guide sleeve 410' is integrally formed with the plate mounting bracket 440', which couples the plates, thus registering the friction surfaces 442' and 444' with the lens through the preferably rigid coupling between the components of the optics group.

Actuator Assembly—Optics Group

The actuator assembly and optics groups are coupled through drive elements. As shown in FIG. 10, the actuator assembly is configured such that a first front drive element 710' interacts with a first front friction surface 542'. Further a second front drive element 712' interacts with the second front friction surface 544'.

The remainder of the vibrational actuator assembly is configured to effect and control movement of the drive elements to apply frictional forces to the friction surfaces of the front and rear optics groups.

Preferably, as illustrated, the actuator assembly includes piezoelectric elements coupled to the drive elements. As shown in FIG. 10, the first rear drive element 610' is coupled to the first rear piezoelectric element 620'. Preferably, each of the piezoelectric elements is in the form of a parallelepiped. Preferably, the piezoelectric elements are constructed from piezoelectric materials, such as certain ceramics. Preferably the drive elements are constructed of high-friction ceramics. In some embodiments, the drive elements and the piezoelectric elements are integrally formed.

Most preferably, the piezoelectric elements are constructed similarly to the active portions of the drive elements disclosed and discussed in U.S. patent application Ser. No. 10/173,766 of Johansson, filed Jun. 19, 2002 and entitled "Near-resonance electromechanical motor", and in U.S. patent application Ser. No. 10/737,791 of Mattsson, filed Dec. 18, 2003 and entitled "Electromechanical motor and method of assembling therefore."

Actuator—Main Housing

Each of the piezoelectric elements is coupled to a flexible actuator board 10' and therethrough to the main housing 100. Preferably, flexible couplings are used to couple a piezoelectric element to the actuator board 10. Preferably, each coupling permits movement of the piezoelectric and accompanying movement of the resilient actuator board 10'. Preferably the couplings are located at points on the piezoelectric elements that are node points under preferred resonant operating conditions.

Referring to FIG. 11, the first rear piezoelectric element 620' is coupled to the actuator board 10' via the couplings 632' and 634'. The resilient actuator board 10' is coupled to the housing 100 at the actuator board interface features 112, 114, 122, 124, 132, and 134. Referring to FIG. 10, the resilient actuator board 10' includes a plurality of mounting features 11, 11a, 12, 12a, 13, and 13a configured to interface with the actuator board interface features of the main housing 100.

Further, referring to FIG. 9, the resilient actuator board 10' is coupled along a top surface of the housing 100, and through a connector 50 interfaces with a top branch 36 of the main printed circuit board 30 (see FIG. 7).

The actuator assembly structural features 110, 120, and 130 host the actuator board interface features 112, 114, 122, 124, 132, and 134, and provide a structural separation between the actuators, registering them relative to the main housing 100. The couplings 632' and 634' secure the resilient actuator board 10' to the piezoelectric elements, constraining the elements to positions permitted by the resilience of the actuator board and the couplings themselves.

In similar fashion, the second rear piezoelectric element 622' is coupled to the actuator board 10' via the couplings 636' and 638'. Similarly, the first and second front piezoelectric elements are coupled to the resilient actuator board and therethrough to the main housing via their respective couplings.

The entirety of the main housing 100 is preferably constructed of a rigid material, thus registering actuator assembly structural features 110, 120, and 130 and their respective interface features relative to one another. In addition, these features are registered to the guide pins 2 and 3, and the image sensor 6. Thus, this configuration registers the actuator board relative 10' to the optics groups. Though the resilience of the actuator board 10' permits the actuators to be slightly displaced, it registers them to a substantially fixed location.

Position Sensing, Control and Referencing Components

In both types of embodiments, the present invention includes position sensing, control and referencing features adapted to track movement of the optics groups and control the actuators to effect movement of the optics groups via mechanisms discussed above. The illustrated embodiments of FIGS. 5-7 and 10 most clearly show the components and features associated with these functions. However, consistent with the present invention, other embodiments and types of embodiments include these features.

Sensing Target

Some embodiments of the present invention include sensing targets to provide feedback on positioning. In some embodiments, a sensing target is disposed on a lead screw. In some embodiments, a sensing target is disposed on an optics group. Linear targets are consistent with the present invention. In addition, distance-measuring targets are also considered.

In some embodiments of the present invention a functional group, e.g. the rear optics group 400, includes a sensing target. In FIG. 10, a linear sensing target 490' is positioned in a rear functional group, positioned adjacent to the guide sleeve 410'. The position sensing target 490' is configured to engage with the position sensor 910. The position sensing target 490' includes a plurality of features 495' to aid in position sensing.

Linear targets are acceptable in relatively low precision positioning applications. Further, linear targets are preferred in applications where the target need move over a relatively large range. Here, the linear target is employed in the rear optics group because the group is used for zoom purposes.

In some embodiments, a distance sensing target is included as part of an optics group. FIG. 10 illustrates the sensing target 590' configured as part of the front optics group. Here, the target 590' is constructed as an integral part of the optics group. However, in some embodiments, a sensing target is modular, or merely coupled with an optics group. The target 590' is configured to engage with the position sensor 920 (FIG. 7), which is preferably a direct distance sensor. The target 590 comprises some reflecting surface. In some embodiments the target 590' includes a pattern or reflectivity gradient. Preferably a circular reflectivity gradient is used.

Sensors

The embodiments of the present invention include position sensors adapted to sense a variety of targets. For example, linear targets are consistent with the present invention. In addition, distance-measuring targets are also considered.

In some embodiments of the present invention a functional group, e.g. the rear optics group 400, includes a sensing target. In FIG. 7, a linear sensing target included on the rear functional group is engaged with a linear position sensor 910. The position sensor 910 is engaged to detect the movement of the sensing target, for example via changes in its reflectance due to surface features. Linear sensors are acceptable in relatively low precision positioning applications. Further, linear sensors are preferred in applications where the target need move over a relatively large range, as the sensor remains engaged along the full length of the linear target. The linear sensor is employed in the rear optics group because the group is used for zoom purposes.

In some embodiments, a distance sensor is employed. FIG. 7 also illustrates the distance sensor 920, engaged with the distance target of the front optics group. Preferably the sensor 920 is a direct distance sensor configured to sense changes in reflectance as the target changes its distance from the sensor.

Sensors are preferably coupled to control systems via communications circuitry. In the illustrated embodiments, the position sensor 910 is coupled via the front branch 32 to a main PCB 30. Similarly, the position sensor 920 is coupled via the rear branch 34 of the main PCB 30.

Further, the sensors are preferably coupled to the main housing 100 to register them relative to the remainder of the module, and to support them structurally. The figures that include the main housing 100 do not show the sensors, however, as they are preferably within the structure of the housing.

Control

The position sensors 910 and 920, as well as the actuator assembly, are coupled through communications circuitry to a main PCB 30, which is preferably coupled to a control system (not shown). As illustrated, in FIGS. 7 and 9, the front branch 32 couples the distance position sensor 920, the rear branch 34 couples the linear position sensor 910, and the top branch 36 couples the actuator assembly (through the actuator board 10' and the connector 50).

Preferably, the control system is configured to receive signals from the position sensors and to control the actuators based on those signals and on other input. One other source of input is hard stop referencing as described below. Further, the system preferably performs a variety of processing and operational features as described below in the "Position Sensing" section.

Mechanical Hard Stop Latch

Preferably, embodiments of the present invention include features configured to permit referencing of an optics group via mechanical hard stop.

Figure 6A:
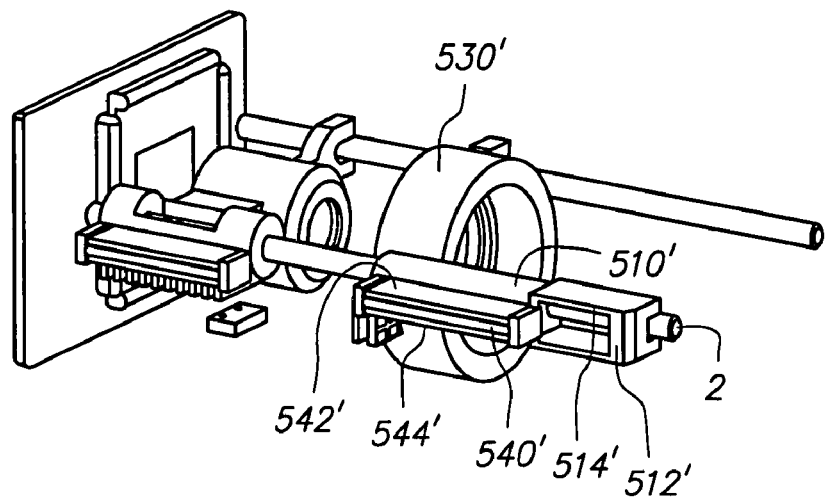
FIG. 6A is an isometric view from an actuator side of internal parts related to position referencing consistent with some embodiments of the present invention.
Figure 6B:
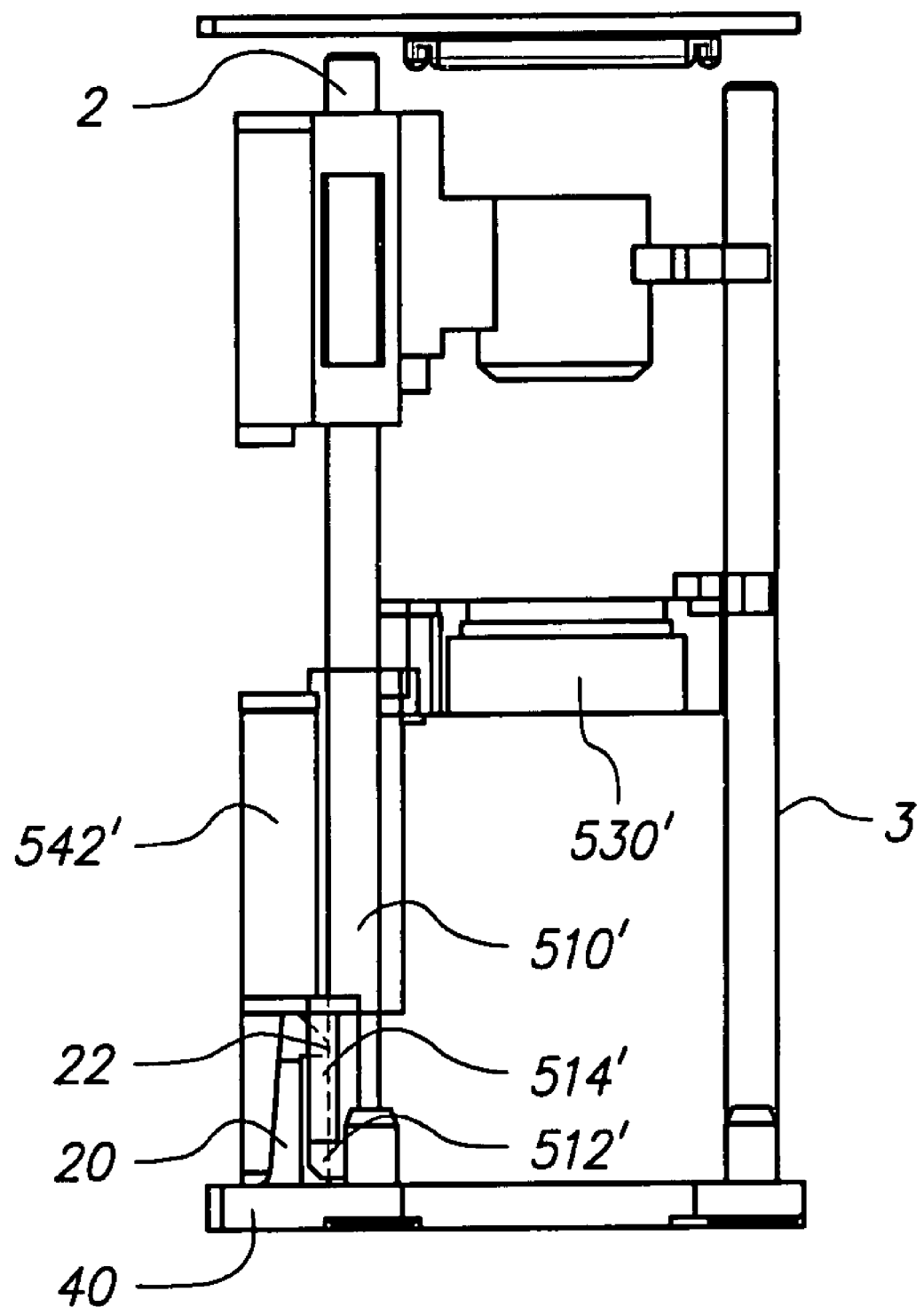
FIG. 6B is a plan view of internal parts related to position referencing consistent with some embodiments of the present invention.

Referring now to FIGS. 6A and 6B, these include a snap-fit arrangement between the front optics group 500 and the pin alignment guide plate 40. In other embodiments, the main frame provides a hard stop. For example, in an end-stop position the back edge of the rear guide sleeve is stopped against the main housing of the module (not shown).

To provide mechanical stop capabilities, the snap-fit arrangement requires specialized features on both the pin alignment guide plate 40 and the front optics group. The front optics group includes the reference pocket 514, as shown in FIG. 6A. The reference pocket 514 is arranged along the axis of the primary guide pin 2, adjacent to the guide sleeve 510. The wall of the reference pocket 514 proximal to the guide sleeve 510 provides a mechanical hard stop reference for the extreme forward position (furthest from the image sensor) in the range of optics group. Similarly, the forward wall 512 of the reference pocket 514 distal from the guide sleeve 510 provides a mechanical hard stop reference for the extreme near position (closest to the image sensor) in the range of front optics group. The actual mechanical stop of the front optics group at the reference points is provided by the interface between the reference pocket 514 and the mechanical stop element 20 of the pin alignment guide plate 40, as shown in FIG. 6B.

Referring now to FIG. 6B, the extreme forward position of the front optics group is shown. As illustrated the interface between the mechanical stop element 20 and the reference pocket 514 is mechanically preventing the front optics group from moving further from the sensor. The latch portion 22 of the mechanical stop element 20 provides a hard stop at the other extreme position by interlacing with the forward wall 512 of the reference pocket 514. As illustrated, the latch portion 'snaps' in to the reference pocket 514 and its flat portion serves as the reference stop.

Because both hard stop references are provided by the same part (mechanical stop element 20) this configuration can be used to accomplish automated calibration of the position sensors as the distance between the two extreme positions is relatively well defined.

Position Sensing

Embodiments of the present invention include position-sensing elements configured to provide feedback to an actuator control system. These elements permit the module to accurately position functional groups, e.g. optics, by using non-linear actuator motors.

Preferred embodiments of the present invention employ a sensing target that moves in concert with a functional group of the module, and a sensor configured to detect and encode data representing movement of the sensing target. For example, some embodiments use reflection encoding of a mobile sensing target that comprises regions of differing reflectance. Other embodiments use direct encoding of linear distances, in some cases judged via reflection from a target that has a reflectance gradient. An exemplary position sensing system comprises the position sensors 910 and 920 and the position sensing targets 490 and 590 shown in FIG. 5 along with control and communications hardware.

Reflection Feature Encoding

In the exemplary reflection encoding system, a sensor includes an element that emits radiation and an element that detects radiation. A target includes dark and light bands, for example. The dark bands tend to absorb a greater proportion of the emitted radiation than do the light bands. The sensor detects the radiation reflected by the bands. As the target moves relative to the sensor, the absorption and reflectance of the sensing target portion aligned with the sensor varies. The sensor encodes this variation. A variety of encoding algorithms and processes are consistent with the present invention. For example, a sensor could simply detect each transition between a dark and light band. In another example, a sensor could simply encode the variation in intensity as a target changes its distance from the sensor.

System Resolution

The resolution of a reflection encoding system is determined by several factors. The distance between the emitter/detector and the target, the beam spread of the radiation used, and the native target resolution all play important roles in determining a system's resolution. These three factors do not act separately, rather they interact, and each must be tuned relative to the others.

In a linear system, native target resolution is essentially a function of feature size. The smaller the critical dimension— the dimension parallel to sensor movement—of a target's features, the greater its native target resolution. For example the target 490 of FIG. 5 uses stripe pairs as features. The sensing system is configured to move stripes along their narrow dimension across a sensor's field of view. Thus a critical dimension of a stripe pair in the illustrated configuration is its width along the narrow dimension.

However, a position sensing system does not guarantee high resolution simply by using a high native target resolution. A suitable combination of low beam spread radiation and tight emitter-target tolerances is required to achieve a maximal resolution permitted by a given feature size. The beam spread and tolerance specifications are complementary: a decrease in beam spread combined with an appropriate increase in tolerance can maintain a given resolution, and vice versa.

For a given feature size, there is a maximum radiation beam spread above which the features are not resolvable via reflection encoding. FIG. 15B illustrates the maximum beam spread for a series of light sources (white squares on left hand side) emitting light towards a series of absorptive and reflective bands (right hand side). The detail shown in FIG. 15C illustrates a 20-micron wide light source paired with a target having similarly-sized features. In this case, the maximum tolerable spread is 10 microns.

Under set diffusion conditions, the maximum tolerable spread and desired resolution determine a maximum spacing between a radiation source and the target. This spacing, distance d in FIG. 15C, is proportional to the required resolution, and inversely proportional to the tangent of an angle representing the diffusion of the radiation. For example, given a typical LED diffusion angle of 10 degrees, to achieve 10 micron resolution the distance d should be less than 56.7 microns. Thus, to achieve the native target resolution, a suitable combination of beam spread radiation and spacing should be employed.

Native Target Resolution

Some embodiments of the present invention employ position sensing systems with beam spread and tolerance optimized to operate at native target resolution. In reflection encoding, a variety of methods, strategies, and devices are available to achieve this goal.

FIG. 16A illustrates a direct imaging approach where a radiation emitter (white rectangle), e.g. an LED, produces radiation, which is supplied to the target without additional processing. A portion of the radiation reflecting from the target is detected by a detector (hatched rectangle). In this type of approach, the emitter must produce radiation with a sufficiently low beam spread to resolve the target features.

Tolerances

One method of achieving native target resolution is closely spacing the emitter/detector and the scanning target. However, tightening tolerances increases the precision required in manufacturing both the target, and the device as a whole. For these and other reasons, embodiments of the present invention preferably space the emitter/detector and scanning target at distances achievable within tolerances typical of mass manufacturing.

Active Area—Emitter/Detector Modification

Figure 17:
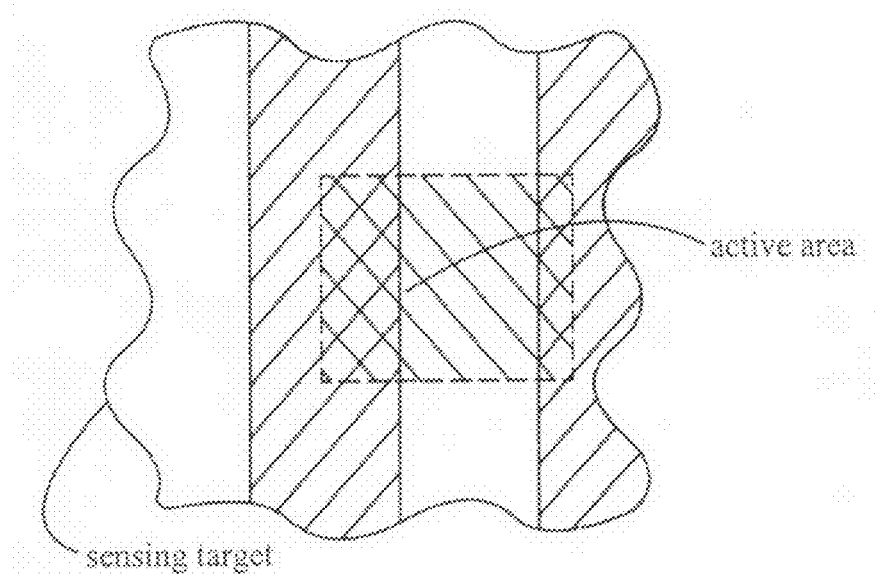
FIG. 17 is a detailed schematic of an active area of interface between a sensing target and a sensor consistent with some embodiments of the invention.

Several combinations of features and methods can be employed to lessen the spacing requirements tolerances or decrease problems caused by diffusion of the radiation. In reflection encoding, a portion of the sensing target is excited by radiation and a detector receives a signal from the sensing target. The signal received represents the characteristics of an active area of the sensing target. Preferably, the active area is sized and located to match critical feature dimensions of the sensing target. For example, FIG. 17 illustrates the active area of a sensing target.

The size and location of the active area are determined by characteristics of both the emitter and the detector. In some cases, the radiation is conditioned to limit the portion of the sensing target excited by radiation. In some cases, the field of view of the detector is cropped.

Some techniques involve radiation processing measures that permit the use of higher resolution targets at manufacturable spacing than would be possible using more diffusive radiation. FIG. 16B illustrates a system in which a lens is used to collimate radiation from a detector. Collimating the radiation permits target-sensor spacing to increase relative to direct imaging while maintaining ability to resolve a set feature size. The maximum spacing and resolvable feature sizes are determined by the spreading of the radiation following collimation.

Some techniques involve elements configured to limit the field of view of a sensor to a portion of its native field of view. FIG. 16C illustrates a system in which a pinhole is used to prevent 'bleed over' from an adjacent region from preventing detection of a transition. In this case, reflected radiation must pass through the centered pinhole placed near to the target surface before reaching the detector. This system can require higher intensity emitters, as relatively little radiation is available through the pinhole.

Though certain embodiments of the present invention do employ active area cropping strategies, such as radiation conditioning, the additional devices or features needed to carry out these strategies increases the cost and complexity of the manufactured module. Preferably, embodiments of the present invention employ other means to achieve desired resolutions.

Beyond Native Target Resolution

At certain thresholds, achieving high system resolution though use of high native target resolution begins to necessitate radiation conditioning or tight spacing. As outlined above, these elements increase the complexity of a module and the precision required in manufacturing. Therefore, for resolutions above these thresholds, embodiments of the present invention preferably employ a lower native target resolution combined with at least one of a variety of strategies for achieving system resolution greater than native target resolution.

Active Area

The methods of defining an active area referred to above relate to conditioning radiation from an emitter, selecting a detector with an appropriate field of view, or modifying the field of view using an external device.

Preferably, the sensing target and detector are configured such that a single feature dominates the field of view. For example, as illustrated in FIG. 17, an active area is sized to match the width of a stripe pair. Typically, the feature size of the target is chosen based on the field of view. However, the required resolution can also be a factor in determining feature size.

Data Processing

Preferably, embodiments of the present invention process data from a sensor to achieve resolutions higher than native target resolution. A variety of processing techniques, methods and elements are employed within various embodiments of the invention, including threshold-based signal conversion and interpolation.

Preferably, embodiments of the present invention encode a portion of the sensing target within the active area into a voltage. The voltage varies depending on the character of the portion of the sensing target within the active area at time of encoding.

Embodiments of the present invention preferably match the dimensions of the active area to the critical dimensions of the sensing target features in order to produce a smoothly varying signal. FIG. 17 illustrates a preferred relationship between the active area and sensing target feature dimensions. The active area is sufficiently large along the direction of the critical dimensions so that it will not sequentially encounter regions with the same light/dark characteristics. In the illustrated embodiment, along the critical dimension the active area is larger than one feature's width and smaller than twice that width. This type of configuration substantially prevents 'flat' spots from occurring within the analog signal produced.

Figure 18:
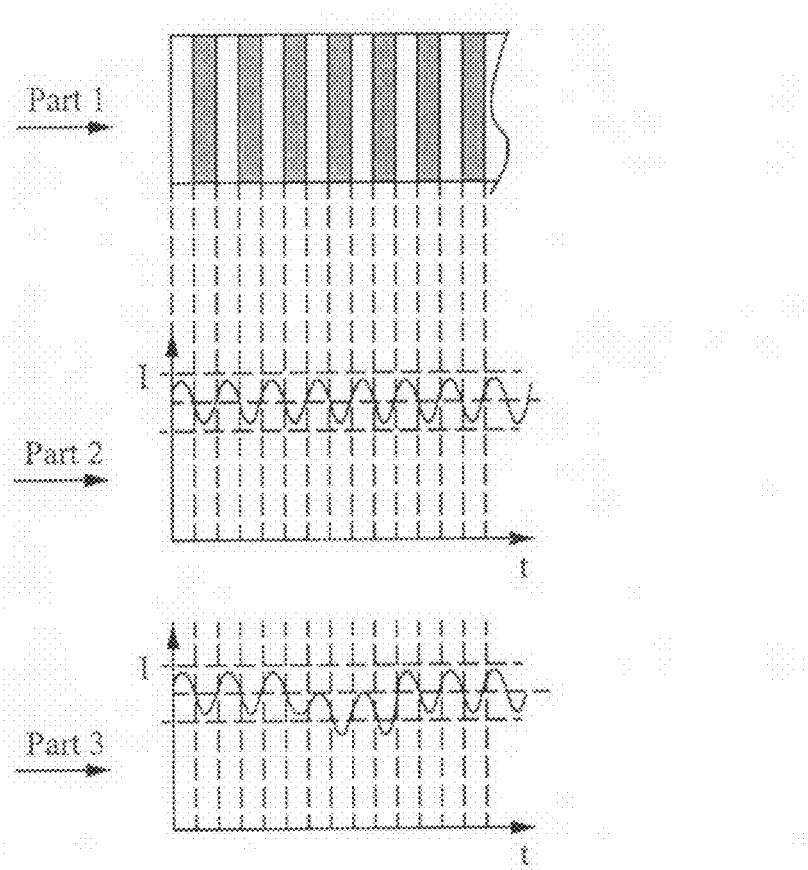
FIG. 18 is a schematic representation of a signal produced from a sensing target consistent with some embodiments of the invention.

Over time, as the sensing target moves through the active area, the system forms a signal representing the portions of the sensing region that have passed through the area. As shown in FIG. 18, a sensing target, part 1, and a varying signal, part 2, are correlated along a time axis t. The strength of the signal in part 2 at a given point in time is determined by the characteristics, e.g. the proportion of light and dark stripe, within the active region at that time. As illustrated, the minima of the signal in part 2 correspond in time to the central axes of the dark stripes. Similarly, the maxima of the signal in part 2 correspond in time to the central axes of the light stripes.

In some embodiments the signal is a continuous encoding of the voltage, in other embodiments the signal is a series of discrete samples taken at a particular frequency. In either case, the signal preferably contains multiple samples related to each feature of the sensing target as it moves across the sensor's field of view.

The encoding process produces a variable signal representing the movement of the sensing target. The minima and maxima of the signal represent movement of the sensing target at its native target resolution. Preferably, this variable signal is an analog voltage. In some embodiments, interpolation is used to construct higher resolution data between the minima and maxima of the variable signal. Preferably the interpolation error occurs only within a given period of the native target resolution and is reset with each minimum or maximum of the signal. This limits the error introduced by interpolation to a substantially fixed percentage of the native resolution.

A processing system receives a variable signal from the sensor and produces corrected movement data at a resolution higher than native target resolution. For example, in some embodiments, the analog voltage signal is supplied to an analog to digital converter (ADC). The analog signal, which was produced at a sampling rate that results in multiple samples per feature, contains sufficient information to support ADC production of digital signal with a resolution greater than native target resolution. In some embodiments, an ADC process using multiple thresholds is used to encode an analog signal to a higher-resolution digital signal.

The corrected movement data is then translated into position data that represents the position of a functional group coupled to the sensing target. For example, in some embodiments digital data from the ADC is supplied to a controller where it is analyzed and translated into position data.

Preferably, embodiments include additional calibration of processing circuitry. In the preferred embodiment, an initial calibration is accomplished automatically during power on. For example, in an ADC-based system, self-calibration during power-on preferably determines the input range needed for data. Embodiments that use self-calibration do not require initial calibration during manufacturing or storage of fixed calibration parameters over their lifetime. In addition, the calibration preferably defines the initial position for each functional group. In some embodiments, these initial positions are determined by a hard reference stop discussed elsewhere in greater detail. In some embodiments, the positions are determined via information embedded into the sensing target. In some embodiments, position is referenced by the absence of interaction between the sensor and sensing target. Specifically, referring to the mechanical hard stop references described above with reference to FIGS. 5, 6A, and 6B are preferably used as references as described above. In addition, the overall distance between reference stops can be used to recalibrate the position sensors.

However, some embodiments also include continuous calibration during sensing to handle signals with noisy time-variance. A variety of configurations produce signals with slight instabilities over time. For example, FIG. 18, part 3 illustrates a signal with an average magnitude that 'wobbles'. A variety of design and manufacturing decisions may result in such signals, for example physical wobbling of sensing targets due to manufactured tolerances. In some embodiments a calibration constant correlated to instabilities is used to counteract them and dynamically correct the processing output. An exemplary calibration constant is the average magnitude over a trailing time or frequency period.

In some embodiments, non-volatile memory elements are included in the control or processing circuitry and used to provide additional manufacturing and calibration data. Preferably, this additional data is used to adjust for component variation and manufacturing tolerances.

Some embodiments that employ interpolation use additional hardware and/or firmware (e.g. a clock for timing and for analysis). If the actuator is very non-linear, interpolation can introduce positioning error. Preferably, embodiments of the present invention use ADC techniques.

Direct Distance Encoding

In an exemplary distance detecting system, a sensor includes an element that emits radiation and an element that detects radiation. A target includes reflective portions, for example. An exemplary target could simply be a uniform reflective surface. However, to extend range or increase uniformity of response, the use of targets with patterns, including three dimensional patterns, or gradients of reflectivity is considered. One example is a corner-cube reflector used to increase directed reflectance of oblique radiation components. The sensor detects the radiation reflected by the target. As the target moves relative to the sensor, the intensity of the radiation reflected from the sensing target increases or decreases accordingly. The sensor encodes this variation. A variety of encoding algorithms and processes are consistent with the present invention. For example, a sensor could simply detect the overall intensity. In another example, a sensor could simply encode the change in intensity over time.

System Resolution

The resolution of a distance encoding system is determined by several factors. The strength of the emitter, the beam spread of the radiation used, and the presence of features on the target all play important roles in determining a system's resolution. These factors do not act separately, rather they interact, and each must be tuned relative to the others.

In a distance system, native target resolution is essentially a function of the features present on the target. For example, if the target has a reflectivity gradient, the reflectance of the target yields higher density information than does a uniformly reflective target However, a position sensing system does not guarantee high resolution simply by using a high native target resolution. A suitable combination a sufficient signal-to-noise ratio, yielded by low beam spread radiation, the target, and a precise sensor, and sufficient AD converter resolution is required to achieve a maximal resolution permitted by a given target.

Active Area—Emitter/Detector Modification

Several combinations of features and methods can be employed to decrease problems caused by diffusion of the radiation. In distance encoding, the sensing target is excited by radiation and a detector receives a signal from the sensing target. The signal received represents the characteristics of an active area of the sensing target.

Preferably, the entire sensing target is excited at all potential distances from the emitter. Also preferably, the sensing target is the dominant reflective surface within the sensing area. Because the resolution of distance encoding systems depends on precisely judging changes in intensity of the reflected radiation, light leaks and other noise sources can be especially problematic. Preferably, the portions of the sensing area, the area impinged upon by radiation from the sensor, that aren't the sensing target, are selected to absorb radiation.

Data Processing

Preferably, embodiments of the present invention process data from a sensor to achieve resolutions higher than otherwise possible. A variety of processing techniques, methods and elements are employed within various embodiments of the invention.

Preferably, embodiments of the present invention encode detected radiation into a voltage representative of current generated at the sensor. The signal voltage varies depending on the proportion of radiation reflected by the sensing target at time of encoding.

In some embodiments the signal is a continuous encoding of the current, in other embodiments the signal is a series of discrete samples taken at a particular frequency. In either case, the signal preferably contains multiple samples related to a critical time unit for which resolution is needed. In other embodiments, the frequency is preferably selected to take a minimum number of samples per unit change in the current.

The encoding process produces a variable signal representing the movement of the sensing target. The minima and maxima of the signal represent extremes in the position of the sensing target.

A processing system receives a variable signal from the sensor and produces corrected movement data. For example, in some embodiments, the analog signal is supplied to an analog to digital converter (ADC). The analog signal, which was produced at a sampling rate that results in multiple samples per critical time unit or per unit change in current, contains sufficient information to support ADC production of digital signal with a sufficient resolution. In some embodiments, an ADC process using multiple thresholds is used to encode an analog signal to a higher-resolution digital signal.

The corrected movement data is then translated into position data that represents the position of a functional group coupled to the sensing target. For example, in some embodiments digital data from the ADC is supplied to a controller where it is analyzed and translated into position data.

Preferably, embodiments include additional calibration of processing circuitry. In the preferred embodiment, an initial calibration is accomplished automatically during power on. For example, in an ADC-based system, self-calibration during power-on preferably determines the input range needed for data. In addition, the calibration preferably defines the initial position for each functional group. In some embodiments, these initial positions are determined by a hard reference stop discussed elsewhere in greater detail. In some embodiments, the positions are determined via information embedded into the sensing target. In addition, the overall distance between reference stops can be used to recalibrate the position sensors.

In some embodiments, non-volatile memory elements are included in the control or processing circuitry and used to provide additional manufacturing and calibration data.

Preferably, this additional data is used to adjust for component variation and manufacturing tolerances.

Some embodiments that employ interpolation use additional hardware and/or firmware (e.g. a clock for timing and for analysis). If the actuator is very nonlinear, interpolation can introduce positioning error. Preferably, embodiments of the present invention use ADC techniques.

Configurations

Embodiments of the present invention include position sensing systems that employ a variety of different configurations of sensors and sensing targets. Some embodiments include direct distance sensing targets configured to permit a position sensor to determine its distance therefrom. In addition, some embodiments include linear sensing targets coupled to a functional group and configured to move therewith. The sensing systems discussed in the examples below are illustrated with linear sensing targets; however, the methods, strategies and equipment described are also contemplated for use with distance targets within some embodiments of the present invention.

For example, a system employing a linear sensing target is illustrated in FIG. 15A. As shown by the cross sectional view, a position sensing system includes the linear target 3350 positioned a distance d from the emitter/detector 3030. The field of view of the emitter/detector 3030 subtends a region of the target 3350 that includes a maximum of two transitions. In some embodiments the emitter/detector is a photoreflector. In some embodiments the emitter is an LED. In some embodiments the emitter/detector 3030 is a photoreflector.

The dark bands of the sensing target tend to absorb radiation emitted from the emitter, while the light bands of the sensing target tend to reflect radiation emitted from the emitter. The sensors detect transitions in absorption and reflectance as the bands move relative to the sensor windows.

In some embodiments, a detector encodes a given transition at different points in time. In addition, in some embodiments, a detector includes means for encoding a transition in two data forms that differ by a constant, such as a phase. In some embodiments two separate sensors encode transitions out of phase of one another. In other embodiments, a single sensor views transitions at two different points in space. Preferably, in these embodiments a control system combines the out-of-phase data, permitting it to detect a direction of movement as well as its magnitude.

A position sensing system provides position data for a lens group over its range of motion. In some embodiments of the present invention, a position sensing system tracks the relative position of an optics group to within 70 microns over a range of 10 mm. In addition, processing steps as outlined above are preferably employed to increase resolution above that offered natively by the target.

Operation

Preferred systems employ the position sensor data to control an actuator. In some embodiments, the data is used to predict the movement per cycle of the actuator. In some embodiments, the data is used to predict the movement per unit time that the actuator is engaged and powered on. In some embodiments, the data are used on a real-time basis with a correction cycle for increased accuracy. Preferably, the particular implementation used is determined in accordance with the particular actuator used.

Some embodiments of the present invention use the position data during zoom and auto-focus operation to accurately position and track optics groups. Preferably, during zoom operation, multiple lens groups are moved and tracked. The actuator control circuitry preferably accurately interprets position data to accomplish tracking and movement. In some embodiments, the control circuitry uses tracking interpretation data that is stored in a table. In some embodiments, the control circuitry uses tracking interpretation data that is stored as a mathematical function. Sometimes, this data is defined in a calibration cycle. Preferably, this calibration cycle takes place during manufacturing.

In addition, the actuator control circuitry preferably accomplishes zoom operations within a specified time frame. Preferably, in embodiments that relate to video optics, the zoom operations are accomplished in a manner that does not disturb video recording. In some embodiments, the zoom range and frame rate are used to determine an optimal step size. For example, the total zoom range is divided by the number of frames within the desired seek time to yield the step size. Thus, each step can occur within a frame. Preferably, when zoom operations occur, the steps are synchronized with the frame rate. In addition, the movement of multiple groups during zoom operations is preferably interleaved. Thus, as each group is moved, the remaining groups are stationary. Interleaving reduces driver and instantaneous power requirements.

In addition, during auto focus operation, typically a single group is moved. Preferably, a group is moved through a focus range in small increments. Preferably, an accurate position sensor and actuator control circuit is employed to permit s positioning in increments below 20 micrometers. In addition, though a variety of circuitry and hardware can be used to implement the auto-focus algorithm, preferred implementations permit reliable return of the group to the position that shows best focus.

As described above, the optical elements of some embodiments are divided into two groups, one group housed in a front barrel, the other group housed in a rear barrel. Typically, the precise motion of these optics groups group within confined spaces is achieved by using the mechanism(s) described above.

The form factor of the auto-focus and zoom module of some embodiments is approximately 9×14×22 mm without a prism or approximately 9×14×30 mm including a prism.

Method

Figure 14:
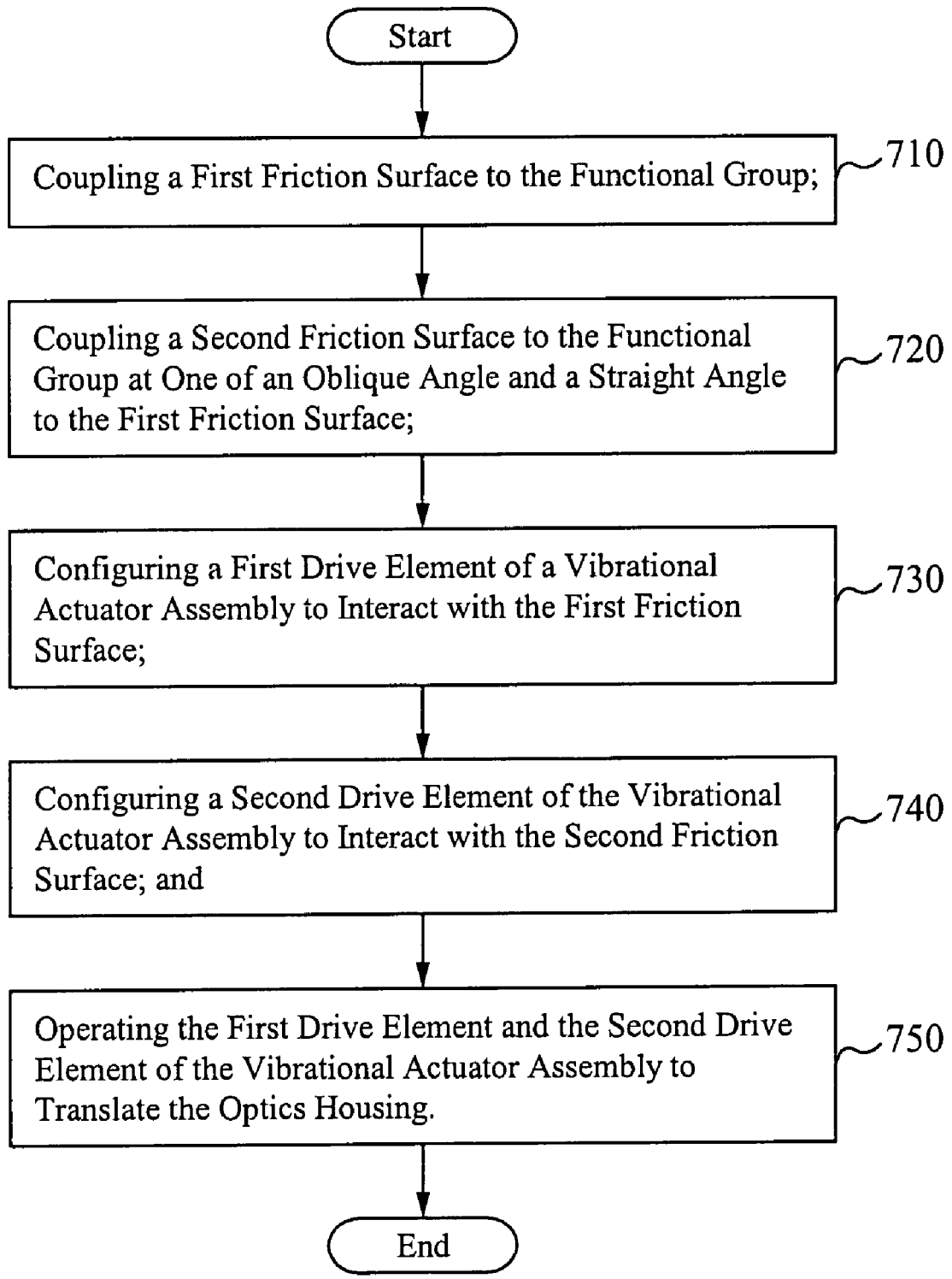
FIG. 14 is a flowchart illustrating a method of positioning a functional element within a system consistent with some embodiments of the present invention.

FIG. 14 illustrates a general method consistent with some embodiments of the present invention. The method drives a functional group within a system for positioning a functional element. The method comprises a step 710 of coupling a first friction surface to a functional group. Another step, 720 is coupling a second friction surface to the functional group at one of an obtuse angle and a straight angel to the first friction surface. Yet another step, 730 is configuring a first drive element of a vibrational actuator assembly to interact with the first friction surface. Another step 740 is configuring a second drive element of the vibrational actuator assembly to interact with the second friction surface. Still another step 750, is operating the first drive element and the second drive element of the vibrational actuator assembly to translate the optics housing.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A system for positioning a functional element, comprising:
    a) a housing;
    b) a primary guide pin coupled to the housing and registered relative to the housing;
    c) a functional group movably coupled with the primary guide pin, comprising a functional element, a first friction surface, and a second friction surface, the first and second friction surfaces are oriented relative to one another at one of an obtuse angle and a straight angle; and
    d) a vibrational actuator assembly coupled to the housing and substantially registered relative to the housing, and including a first drive element and a second drive element, wherein the first drive element is configured to interact with the first friction surface and the second drive element is configured to interact with the second friction surface, and the vibrational actuator assembly operates to translate the functional group,
wherein the first drive element and the second drive element are each in the form of a hollow cylinder.

2. The system for positioning a functional element of claim 1, wherein the vibrational actuator assembly further includes a first piezoelectric element coupled to the first drive element.

3. The system for positioning a functional element of claim 1, wherein the vibrational actuator assembly further includes a second piezoelectric element coupled to the second drive element.

4. The system for positioning a functional element of claims 3, wherein the piezoelectric elements are each in the form of a parallelepiped.

5. The system for positioning a functional element of claims 3, wherein the piezoelectric elements are each configurable to operate at a resonant frequency having at least two node points, and is constrained at two node points.

6. The system for positioning a functional element of claim 1, wherein the vibrational actuator assembly further comprises a spring configured to deform the resilient mounting structure to urge the first drive element against the first friction surface and the second drive element against the second friction surface.

7. The system for positioning a functional element of claim 1, wherein a virtual line drawn between a point of the first friction surface, a point of the second friction surface, and a point of the guide pin is a straight line.

8. The system for positioning a functional element of claim 1, wherein no virtual line drawn between any point of the first friction surface, the second friction surface, and the guide pin forms a straight line, but the virtual line does form a triangle.

9. The system for positioning a functional element of claim 8, wherein the triangle has a minimum area possible for a given spacing between the first friction surface and the second friction surface.

10. The system for positioning a functional element of claim 1, wherein the friction surfaces are each arranged on a portion of a parallelepiped.

11. The system for positioning a functional element of claim 1, further comprising a position sensor configured to detect movement of the functional group.

12. The system for positioning a functional element of claim 1, further comprising a control element, configured to receive data from the position sensor and to operate the vibrational actuator to position the functional element.

13. The system for positioning a functional element of claim 1, further comprising a mechanical stop element coupled to the housing and configured to contact the functional group at a first position and a second position and mechanically stop movement of the functional group.

14. The system for positioning a functional element of claim 13, wherein the functional group includes an opening configured to interface with the mechanical stop element.

15. A system for positioning a functional element, comprising:
 a) a housing;
 b) a primary guide pin coupled to the housing and registered relative to the housing;
 c) a functional group movably coupled with the primary guide pin, comprising a functional element, a first friction surface, and a second friction surface, the first and second friction surfaces are oriented relative to one another at one of an obtuse angle and a straight angle; and
 d) a vibrational actuator assembly coupled to the housing and substantially registered relative to the housing, and including a first drive element and a second drive element, wherein the first drive element is configured to interact with the first friction surface and the second drive element is configured to interact with the second friction surface, and the vibrational actuator assembly operates to translate the functional group,
wherein the vibrational actuator assembly further comprises a spring configured to deform the resilient mounting structure to urge the first drive element against the first friction surface and the second drive element against the second friction surface.

16. A system for positioning a functional element, comprising:
 a) a housing;
 b) a primary guide pin coupled to the housing and registered relative to the housing;
 c) a functional group movably coupled with the primary guide pin, comprising a functional element, a first friction surface, and a second friction surface, the first and second friction surfaces are oriented relative to one another at one of an obtuse angle and a straight angle; and
 d) a vibrational actuator assembly coupled to the housing and substantially registered relative to the housing, and including a first drive element and a second drive element, wherein the first drive element is configured to interact with the first friction surface and the second drive element is configured to interact with the second friction surface, and the vibrational actuator assembly operates to translate the functional group,
wherein a virtual line drawn between a point of the first friction surface, a point of the second friction surface, and a point of the guide pin is a straight line.

17. A system for positioning a functional element, comprising:
 a) a housing;
 b) a primary guide pin coupled to the housing and registered relative to the housing;
 c) a functional group movably coupled with the primary guide pin, comprising a functional element, a first friction surface, and a second friction surface, the first and second friction surfaces are oriented relative to one another at one of an obtuse angle and a straight angle; and
 d) a vibrational actuator assembly coupled to the housing and substantially registered relative to the housing, and including a first drive element and a second drive element, wherein the first drive element is configured to interact with the first friction surface and the second drive element is configured to interact with the second friction surface, and the vibrational actuator assembly operates to translate the functional group;
 e) a mechanical stop element coupled to the housing and configured to contact the functional group at a first position and a second position and mechanically stop movement of the functional group,
wherein the functional group includes an opening configured to interface with the mechanical stop element.

* * * * *